United States Patent [19]
Mitate et al.

[11] Patent Number: 5,478,364
[45] Date of Patent: Dec. 26, 1995

[54] METHOD OF MANUFACTURING LITHIUM SECONDARY BATTERY

[75] Inventors: Takehito Mitate; Naoto Nishimura, both of Nara; Akimasa Umemoto, Kashihara; Hiroshi Okamoto; Kazuo Yamada, both of Nara; Tetsuya Yoneda, Nabari, all of Japan

[73] Assignee: Sharp Kabushiki Kaisha, Japan

[21] Appl. No.: 427,226

[22] Filed: Apr. 24, 1995

Related U.S. Application Data

[62] Division of Ser. No. 242,106, May 13, 1994, Pat. No. 5,432,029.
[51] Int. Cl.$^6$ ............... H01M 006/00; B05D 007/00
[52] U.S. Cl. ............ 29/623.5; 427/126.3; 427/212
[58] Field of Search ............... 29/623.5, 623.1; 427/212, 126.3, 213, 213.31, 305, 226, 372.2, 383.1, 331, 123, 113; 205/144

[56] References Cited

U.S. PATENT DOCUMENTS

| | | | |
|---|---|---|---|
| 4,177,318 | 12/1979 | Williams | 427/113 X |
| 4,400,436 | 8/1983 | Breininger | 427/305 X |
| 5,045,349 | 9/1991 | Ferrando | 427/113 |
| 5,197,993 | 3/1993 | Ferrando et al. | 29/623.5 X |

*Primary Examiner*—Anthony Skapars
*Attorney, Agent, or Firm*—Nixon & Vanderhye

[57] ABSTRACT

The lithium secondary battery includes a positive electrode, a nonaqueous ion conductive medium, and a negative electrode, and the negative electrode includes as a main constituent graphite which permits intercalation and deintercalation of lithium ions, together with copper oxide and a binder.

2 Claims, 5 Drawing Sheets

METHOD OF MANUFACTURING LITHIUM SECONDARY BATTERY

This is a divisional of application Ser. No. 08/242,106, filed May 13, 1994, now U.S. Pat. No. 5,432,029.

BACKGROUND OF THE INVENTION

1. Field of the Invention

The present invention relates generally to secondary batteries, and more particularly, to an improvement of the performance of a lithium battery with a negative electrode containing graphite particles which can cause intercalation and de-intercalation of lithium ions.

2. Description of the Related Art

As miniaturization and power saving have proceeded in the field of electronics, secondary batteries using alkali metals such as lithium have attracted attention. A battery using alkali metal alone such as lithium for a negative electrode is encountered with a problem of short circuit in the battery by repetition of charge/discharge. More specifically, repetition of charge/discharge repeats dissolution and precipitation of the alkali metal, and a dendrite of the alkali metal grows on the surface of the negative electrode. The dendrite grows penetrating through the separator between the negative electrode and the positive electrode, and comes into contact with the positive electrode to form a short circuit.

Use of an alkali metal alloy for the negative electrode of a secondary battery instead of an alkali metal decreases such growth of dendrite and improves charge/discharge cycle characteristic. Use of an alkali metal alloy for the negative electrode however cannot completely prevent the growth of dendrite and there is still a possibility of short circuit in the battery.

In recent years, a negative electrode of carbon or a conductive organic polymer material has been developed taking advantage of insertion and desertion of alkali metal ions rather than metal dissolution, deposition, diffusion in solid or the like as practiced in the case of an alkali metal or an alloy thereof. In such a negative electrode of carbon or a conductive polymer material, dendrites which have been grown in the case of the negative electrode of an alkali metal or an alloy thereof are prevented and the problem of short circuit in the battery has been solved.

Carbon which is a chemically stable substance and can be doped with either an electron-donor element or an electron-acceptor element is a preferable material for an electrode for a battery.

When carbon is used for an active material for a negative electrode, lithium can be intercalated between layers of carbon in 1 lithium atom per 6 carbon atoms at maximum, in other words at most $LiC_6$. At the upper limit, theoretical capacity only by a reaction between carbon and lithium is 372 mAh/g (unit weight of carbon).

Carbon can take various forms from amorphous carbon to graphite. Sizes and arrangements of hexagonal nets of carbon atoms vary depending upon starting materials and manufacturing processes. Use of carbon materials (except graphite) as active materials for negative electrodes are disclosed for example in Japanese Patent Laying-Open Nos. 62-90863, 62-122066, 63-213267, 1-204361, 2-82466, 3-252053, 3-285273, and 3-289068. None of carbon materials disclosed in these prior art documents can achieve the theoretical capacity described above. Even among carbon materials with relatively large charge/discharge capacity, some have their potentials linearly changed at a considerable gradient and do not have enough capacity in the range of voltage used in a battery assembled in practice. More specifically, the carbon materials disclosed in these prior art documents are not satisfactory as a material for manufacturing a negative electrode for a battery with sufficient charge/discharge capacity.

Fong et al reported in J. Electrochem. Soc., Vol. 137, 1990, pp. 2009–2013 that discharge capacity corresponding to the theoretical capacity described above is obtained by use of graphite material as an active material for a negative electrode. This report, however, concerns only small discharge current and does not directly apply to batteries in practice. Japanese Patent Laying-Open Nos. 4-112455, 4-115457, 4-115458, 4-237971 and 5-28996 discloses use of graphite materials as active materials for negative electrodes, but none of these graphite electrodes reaches the theoretical capacity described above and is not satisfactory for manufacturing a battery with high capacity.

In Japanese Patent Laying-Open No. 3-216960, a lithium layer is formed on the surface of a porous carbon material such that pores are not occluded and thus a secondary battery permitting discharge of large current and having improved cycle life and safety is provided. In Japanese Patent Laying-Open No. 4-39864, use of a negative electrode immersed with a metal, which can form an alloy with lithium or an alloy including lithium, inside pores in the carbon material provides a secondary battery with large capacity and improve charge/discharge cycle life and self-discharge characteristic. In these batteries, however, lithium must be treated in an inactive atmosphere which complexes the process of manufacturing electrodes and pushes up cost for the batteries.

While attempts have been made to improve battery cycle life and discharge capacity at large current after storage at a high temperature, for example, by use of a negative electrode of a carbon material coated with a metal (such as nickel and copper) in Japanese Patent Laying-Open No. 4-184863 and by use of a negative electrode of a compound of carbon and at least a metal (one kind of metal such as Ni, Al, Cu or Fe which does not form an alloy with lithium) in Japanese Patent Laying-Open No. 4-259764, much increase of capacity of negative electrodes cannot be expected.

In Japanese Patent Laying-Open No. 5-21065, in order to improve the cycle life of a battery having a chalcogen compound as a main material for a negative electrode which allows dope and dedope of lithium ions, use of a mixture produced by adding a carbon material to a chalcogen compound for a negative electrode is attempted. A reaction of dope or dedope of lithium ions occurs when mean voltage to a lithium reference electrode is about 1 V, and therefore high energy density cannot be provided for such low charge/discharge voltage.

SUMMARY OF THE INVENTION

In view of the foregoing background art, it is an object of the invention to provide a high voltage lithium secondary battery having a graphite composite negative electrode with high capacity and easy to manufacture.

A lithium secondary battery according to one aspect of the invention includes a positive electrode, a non-aqueous ion conductive medium, and a negative electrode, and the negative electrode contains graphite particles which allow intercalation and deintercalation of lithium ions as a main constituent together with copper oxide particles and a binder.

A lithium secondary battery according to another aspect of the invention includes a positive electrode, a non-aqueous conductive medium, and a negative electrode, and the negative electrode contains graphite particles as a main constituent which allow intercalation and deintercalation of lithium ions together with a copper oxide layer covering at least part of the surface of at least part of these graphite particles and a binder.

A method of manufacturing a lithium secondary battery according to yet another aspect of the invention includes a step of coating at least part of the surface of at least part of graphite particles with a copper layer, a step of oxidizing the copper layer coated on the surface of these graphite particles, and a step of forming a negative electrode with these graphite particles coated with the oxidized copper and a binder.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
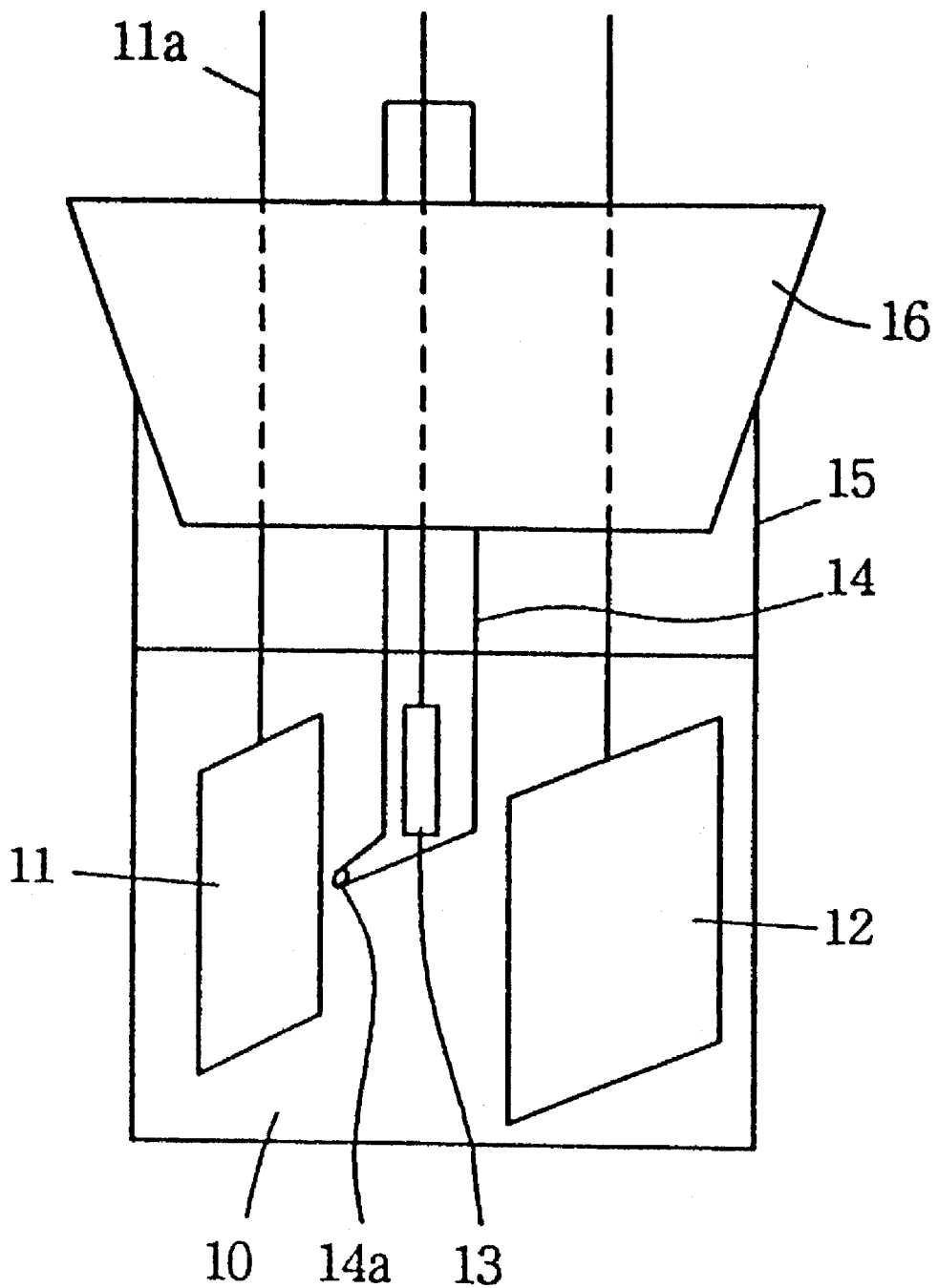
FIG. 1 is a diagram schematically showing the three-electrode method for evaluating a test electrode.
Figure 2:
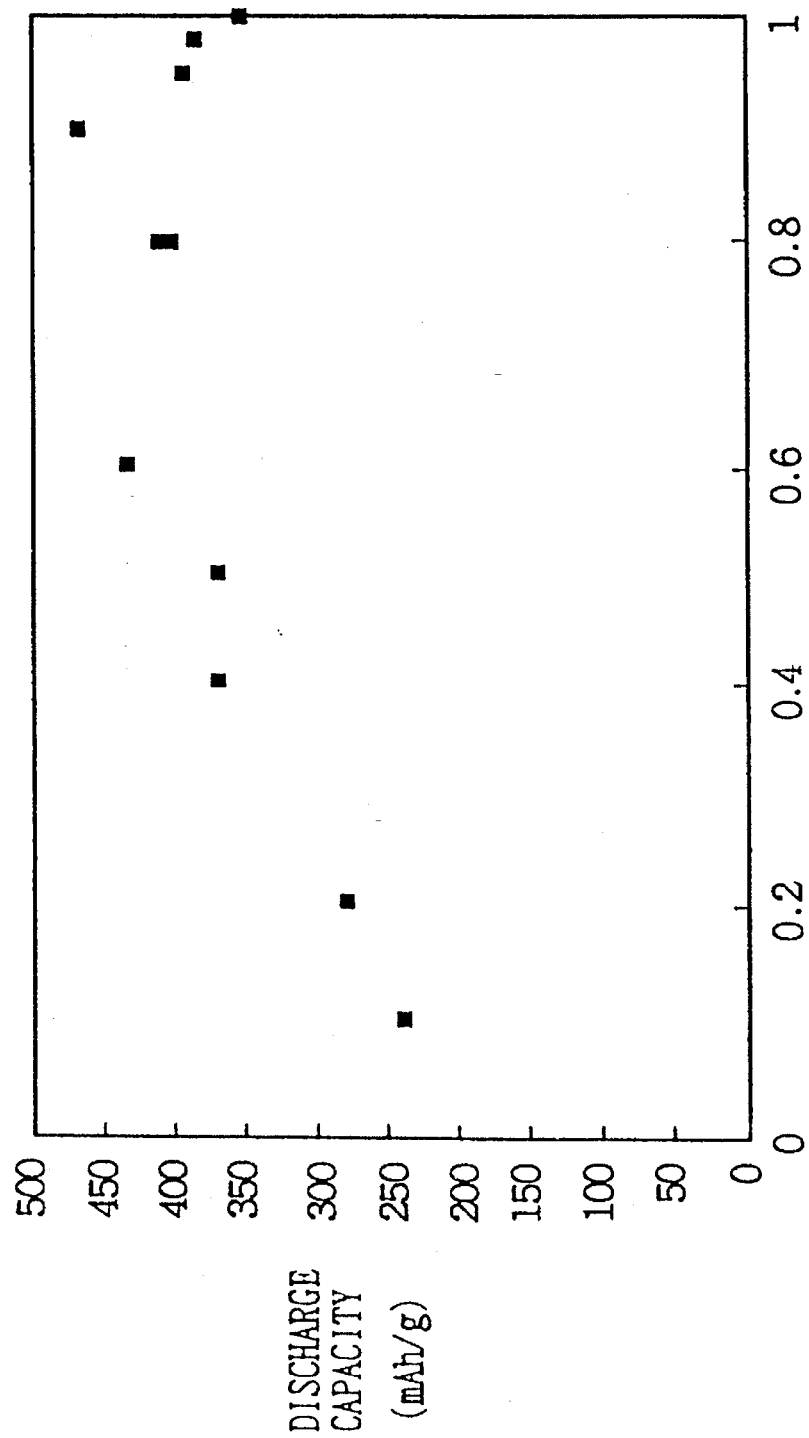
FIG. 2 is a graph showing discharge capacities depending upon ratios of graphite and copper oxide in a negative electrode.

Factors giving influence upon the charge/discharge capacity and discharge voltage of a battery are parameters related to the layered structure of carbon particles included in an electrode, in other words distance $d_{002}$ on (002) plane (interlayer spacing) and the size of a crystallite. Plane distance $d_{002}$ corresponds to an interlayer distance between carbon layers. As the crystallinity of a carbon material increases, electrode potential in intercalation of lithium approximates the potential of lithium, and therefore a carbon negative electrode with high capacity can be expected. Accordingly, considering battery capacity available in an assembled lithium secondary battery (see FIG. 3 and a description related thereto as an example of such a structure), interlayer spacing ($d_{002}$) for the (002) plane of graphite is preferably in the range from 0.335 nm to 0.340 nm, and La and Lc are both preferably at least 10 nm. If the thickness of crystallite Lc in a direction perpendicular to the (002) plane of graphite is smaller than 10 nm, the crystallinity of carbon is poor, and therefore charge/discharge capacity available in the assembled lithium secondary battery is small and not for particle use. Similarly, if the thickness of a crystallite La in a direction perpendicular to the (110) plane of graphite is smaller than 10 nm, the crystallinity of carbon is also poor and charge/discharge capacity available in the assembled lithium secondary battery is small.

For graphite as a main active material for a negative electrode used according to the invention, in argon laser Raman scattering the intensity ratio R of a peak appearing based on the graphite structure in the vicinity of 1580 $cm^{-1}$ relative to a peak appearing based on a imperfections in the graphite structure in the vicinity of 1360 $cm^{-1}$ is preferably at most 0.4. More specifically, at R value of more than 0.4, the crystallinity of carbon is low, negative electrode potential in deintercalation of lithium is higher than the potential of lithium, and therefore charge/discharge capacity available in the assembled lithium secondary battery is small.

Graphite which can be used according to the present invention includes natural graphite, Kish graphite, artificial graphite derived from petroleum coke or coal coke, or exfoliated graphite. Such graphite may be in any form such as sphere, flaky, fiber, or ground, and preferably in the form of sphere, flaky or ground.

When graphite particles are used to form a negative electrode, the particles size of graphite is preferably at most 80 μm. The particle size is obtained as a particle size having a peak in a particle size distribution produced by means of volume based measurement. If graphite having a particle size larger than 80 μm is used, the area of contact between the graphite particles and an electrolytic solution is small, and diffusion of lithium or reaction sites within the graphite particles decrease, which makes difficult charge/discharge at large current.

For copper oxide particles mixed into the negative electrode, a simple substance of copper (I) oxide or copper (II) oxide, or a mixture of them may be used, but copper (II) oxide is preferably used for the purpose of charge/discharge capacity. A preferable ratio of copper oxide contained in the negative electrode depends on kinds and particle sizes of graphite and copper oxide and the percentage of copper oxide in the mixture of graphite and copper oxide is preferably in the range from 2 wt. % to 60 wt. %, and more preferably in the range from 2 wt. % to 40 wt. %. If the percentage of copper oxide is smaller than 2 wt. %, the effect brought about by mixing copper oxide is drastically lost. Meanwhile, if the percentage of copper oxide is larger than 60 wt. % reaction sites between graphite and lithium ions in charge/discharge decrease and charge/discharge capacity available in the assembled lithium secondary battery is reduced.

When a copper oxide layer is formed on the surface of at least part of the graphite particles, the weight ratio of graphite and copper oxide is preferably in the range from 98.1:1.9 to 56.6:43.4, more preferably in the range from 98.1:1.9 to 70.6:29.4.

One method of manufacturing graphite composite particles coated with copper oxide on the surface of at least part of the graphite particles is to coat at least part of the surface of the graphite particles with a copper layer and then to oxidize the copper layer into a copper oxide layer. For a method of coating the surface of graphite particles with copper, electroless plating, vacuum plating, sputtering or the like may be used. Among these methods, the electroless plating method is preferable in view of cost and ease of operation. For electroless plating of copper, an alkali bath including formaldehyde or hydrazine as a reducing agent for example may be used. Alternatively, a commercially available electroless plating bath may be used.

In order to oxidize a copper layer covering the graphite particles, oxidizing in vapor phase with air, oxygen, ozone or the like, or oxidizing with hydrogen peroxide, water containing dissolved oxygen or a salt of oxo-acid (nitrous acid, permanganic acid, chromic acid, bichromic acid, chloric acid, hypochlorous acid or the like) may be employed, but the invention is not limited to these methods.

Oxidizing process with air or oxygen must be performed at a temperature lower than the burning temperature of graphite. The burning temperature of graphite which varies depending upon kinds of graphite is about at least 600° C. Accordingly, the oxidizing process must be conducted at a temperature of at most 600° C. In oxidizing process with air or oxygen, depending upon kinds of graphite, time for oxidizing, oxygen partial pressure, ratios of graphite and copper, the surface of graphite is oxidized and functional groups such as carboxyl group, lactone, hydroxyl group, and carbonyl group result at 400° C. or higher. Accordingly, oxidizing of the copper layer on the surface of graphite particles is desirably performed at a temperature less than 400° C.

In graphite particles coated with copper formed in intermediate steps in the process of manufacturing graphite composite particles coated with copper oxide, a preferable weight ratio of graphite and copper, though depends on kinds and particles sizes of graphite or methods of copper coating, is in the range of 98.5:1.5 to 62:38 (which corresponds to C:CuO=98.1:1.9~56.6:43.4), more preferably in the range from 98.5:1.5 to 75:25 (which corresponds to C:CuO=98.1:1.9~70.6:29.4). If the ratio of copper is less than 1.5%, the effect of copper oxide disappears, and for a ratio larger than 38%, reaction sites for graphite and lithium ions in charge/discharge decreases, and charge/discharge capacity available in the assembled lithium second battery is reduced.

The negative electrode is formed by mixing a binder into graphite particles and copper oxide particles described above or by mixing a binder into graphite composite particles having at least part of its surface coated with copper oxide as described above. For the binder, fluoropolymer such as polytetrafluoroethylene, polyvinylidene fluoride; polyolefin based polymer such as polyethylene, polypropylene; or synthetic rubber may be used, but the binder is not limited to such materials. The percentage of the binder in the mixture of graphite, copper oxide and the binder may be set in the range from 1 wt. % to 30 wt. %. If the percentage of the binder is more than 30 wt. %, the resistance or polarization of an electrode increases, which reduces discharge capacity, and therefore a lithium secondary battery for practical use cannot be manufactured. Meanwhile, if the percentage of the binder is less than 1 wt. %, the binding ability is lost; falling-off of the active material of the electrode and degradation of the mechanical strength of the electrode result; and then it becomes difficult to manufacture a battery. In the manufacture of a negative electrode, the electrode is preferably thermally treated at a temperature in the vicinity of the melting point of the binder in order to reinforce the binding between particles.

A current collector is necessary for collecting current from a negative electrode. A metal foil, a metal mesh, a porous metal or the like may be used for the current collector. The metal used for the current collector is preferably a metal unlikely to form an alloy with lithium in view of degradation of mechanical strength for repeating charge/discharge cycles. Particularly preferable for the current collector is iron, nickel, cobalt, copper, titanium, vanadium, chromium, manganese or an alloy thereof.

For an ion conductive medium, an organic electrolytic solution, solid polymer electrolyte, solid inorganic electrolyte, a fused salt or the like may be used, and use of organic electrolytic solution is particularly preferable. For a solvent for the organic electrolytic solution, ester family such as propylene carbonate, ethylene carbonate, butylene carbonate, diethylcarbonate, dimethylcarbonate, methylethylcarbonate, and γ-butylolactone; ether family such as substituent tetrahydrofuran such as tetrahydrofuran and 2-methyltetrahydrofuran, dioxolane, dimethyl ether, dimethoxyethane, diethoxyethane, and methoxyethoxy ethane; dimethyl sulfoxide; sulfolane; methylsulfolane; acetonitrile; methyl formate; methyl acetate or the like is considered, and a mixture of one or more kinds of them are used as a solvent. Listed as solute is a lithium salt such as lithium perchlorate, lithium borofluoride, lithium phosphofluoride, lithium arsenic hexafluoride, lithium trifluoromethanesulfonate, halogenated lithium, and lithium chloroaluminate, and a mixture of at least one or more kinds of them may be used. An electrolytic solution may be prepared by dissolving the solute described above in the solvent as described above, but solvent and solute other than the above may be used. However, the organic electrolytic solution containing ethylene carbonate is particularly preferable for its stability in the presence of graphite powder.

For a positive electrode in the lithium secondary battery according to the invention, oxide containing $LiCoO_2$, $LiNiO_2$, $Li_xM_yT_zO_2$ (M represents one of Fe, Co, Ni, and T represents a transition metal, or a metal of 4B or 5B family), $LiMn_2O_4$ and $LiMn_{2-x}T_yO_4$ may be used as an active material for the positive electrode. The positive electrode may be formed by mixing a conductive material and a binder in the active material and if desired by further adding solid electrolyte. In the mixing ratio at the time, for 100 weight parts of the active material, the conductive material in the range from 5 to 50 weight parts and the binder in the range from 1 to 30 weight parts can be mixed. For the conductive material, carbon black (acetylene black, thermal black, channel black, for example), graphite powder, metal powder or the like may be used, but other materials may be used. For the binder, fluoropolymer such as polytetrafluoroethylene and polyvinylidene fluoride or polyolefin based polymer such as polypropylene polyethylene, and synthetic rubber may be used, but others may be used.

If the conductive material of less than 5 weight parts is contained or if the binder of more than 30 weight parts is contained, the resistance and polarization of the positive electrode increase, reducing discharge capacity, and therefore a lithium secondary battery for practical use cannot be fabricated. Though a preferable ratio of a conductive material depends on the kind of the conductive material, if the conductive material is contained in more than 50 weight parts, the active material contained in the positive electrode decreases, reducing the discharge capacity of the positive electrode. If the binding material is contained in less than 1 weight part, the binding ability drastically drops. Meanwhile, if the binding material is contained in more than 30 weight parts, the active material contained in the positive electrode decreases and the resistance and polarization of the positive electrode increase, reducing the discharge capacity of the positive electrode, which is not for practical use. Note that in the manufacture of the positive electrode, thermal treatment is preferably performed at a temperature in the vicinity of the melting point of the binder used in order to reinforce the binding between particles within the positive electrode.

Figure 5:
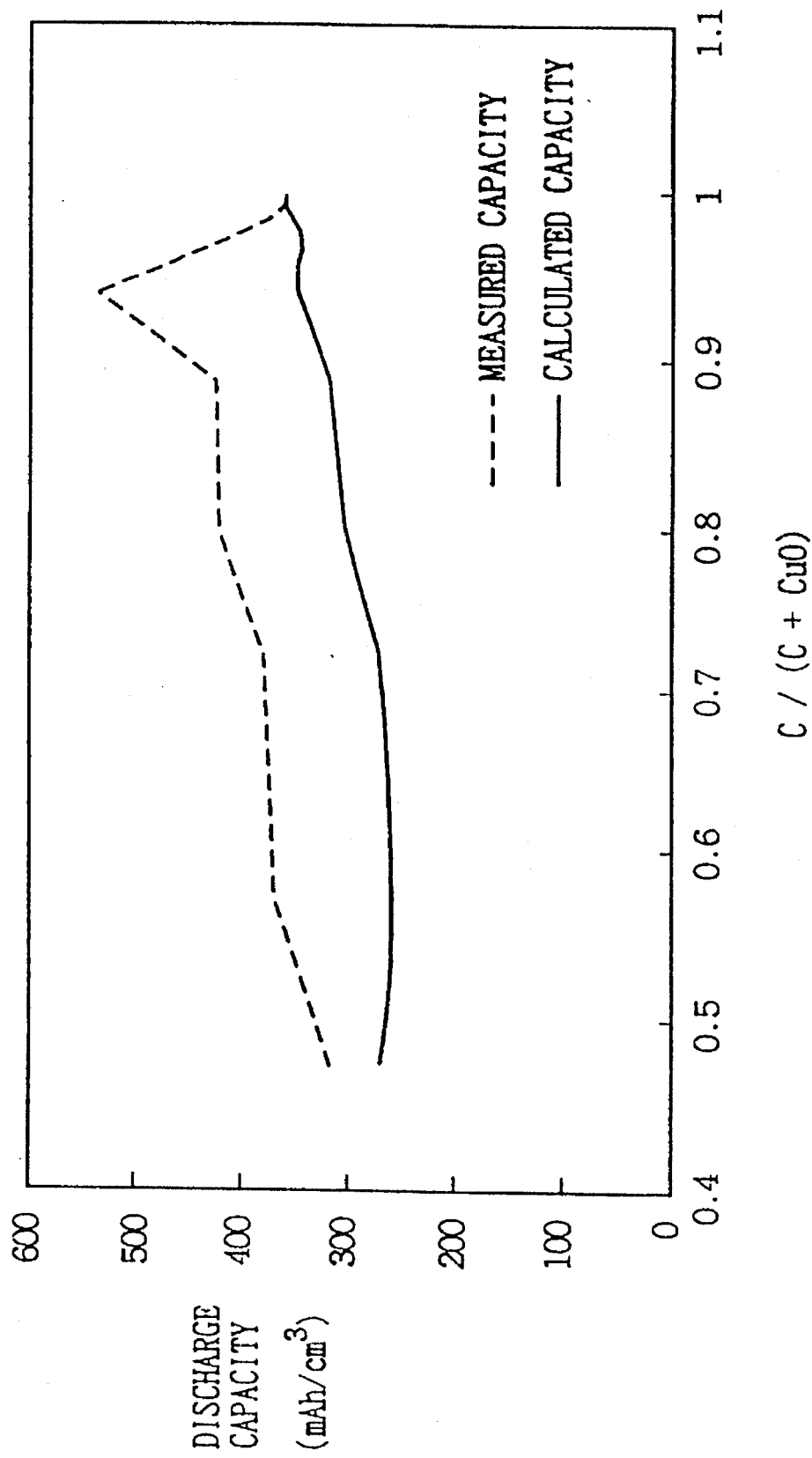
FIG. 5 is a graph showing an unexpected effect brought about by the invention.

In a negative electrode in a lithium secondary battery according to the invention, it may be considered that in addition to increase of capacity by reversible formation and decomposition of a composite oxide of lithium and copper, a reaction of lithium and graphite is promoted by the influence of the composite oxide, and therefore high charge/discharge capacity would result (see FIG. 5 and a description corresponding thereto). The negative electrode according to the invention can more readily be formed than electrodes obtained by forming a lithium layer such that the pores on the surface of a porous carbon material are not occluded or by forming impregnating a carbon material with lithium or lithium alloy for filling the pores. In addition, potential generated by the negative electrode according to the present invention is lower than that of a battery having a negative electrode formed by mixing a chalcogen compound permitting dope and dedope of lithium ions and a carbon material, and therefore a lithium secondary battery with high voltage for use can be provided.

DESCRIPTION OF THE PREFERRED EMBODIMENTS

Now, various embodiments of the present invention will be described. In the following embodiments, the sizes Lc and La of crystallite are measured by means of a well known wide angle X-ray diffraction method. At the time, K=0.9 is used as a form factor for producing the size of crystallite. The particle size is measured with a laser diffraction particle size analyzer MODEL SALD-1100 (SHIMADZU CORPORATION) as a particle size having a peak in a particle distribution.

EMBODIMENT 1

Manufacture of Negative Electrode

As main active materials for a negative electrode, natural graphite particles produced in Madagascar (flaky, particle size of 11 μm, $d_{002}$=0.337 nm, Lc=27 nm, La of 17 nm, R=0, specific surface area of 8 m$^2$/g) was used. The natural graphite particles and sieved particles of commercially available copper (II) oxide (particle size of 27 μm) were mixed in a mortar into a weight ratio of 9.5:0.5. A nonionic dispersing agent and a polytetrafluoroethylene-dispersed solution were added to the mixture of the graphite and copper (II) oxide and formed into paste for application on both surfaces of a copper foil current collector. (The ratio of the total weight of graphite and copper (II) oxide to the weight of polytetrafluoroethylene was 87:13 after dried.) Thus paste-applied current collector was dried at 60° C., heat-treated at 240° C., then pressed, and then dried under reduced pressure at 200° C. in order to remove water. Thus obtained negative electrode had a surface area of 8 cm$^2$ and a thickness of 126 μm. (The thickness of the current collector included in the negative electrode was 50 μm.)

Evaluation of Negative Electrode

The negative electrode obtained as described above was evaluated with the three-electrode method as illustrated in FIG. 1. In FIG. 1, an electrolytic solution 10 was kept in a container 15 having a cap 16. Electrolytic solution 10 was prepared by dissolving 1 mol/l lithium perchlorate in a solvent of ethylene carbonate and diethyl carbonate mixed in the ratio of 1:1. A negative electrode 11 to be evaluated and an opposite lithium electrode 12 were placed a prescribed distance apart from each other in electrolytic solution 10. A lithium reference electrode 13 housed in a Luggin tube 14 was placed between test electrode 11 and opposite electrode 12. Luggin tube has a lower end tapered toward test electrode 11, and the lower end had an opening 14a at its tip. More specifically, electrolytic solution 10 came into the Luggin tube through opening 14a and reference electrode 13 was also soaked in electrolytic solution. The negative electrode was evaluated by flowing current from the copper current collector through a lead 11a.

In a charge/discharge test, charging was performed at a current density 30 mA/g between test electrode 11 and opposite electrode 12. The charging continued until the voltage of test electrode 11 relative to reference electrode 10 reached 0 V. Then, at the same current density, discharging was performed until the voltage of the test electrode relative to reference electrode 13 reached 2.5 V. After the second cycle, charging/discharging was repeated in the same potential range and at the same current density, and evaluation of the negative electrode was performed for discharge capacity. As a result, discharge capacity at the second cycle was 398 mAh per 1 g of carbon and discharge capacity for the 20th cycle was 385 mAh per 1 g of carbon.

EMBODIMENT 2

Natural graphite produced in Madagascar and commercially available copper (I) oxide (particle size of 34 μm) were mixed into the weight ratio of 9.6:0.4, and then a negative electrode was fabricated according to the same method as Embodiment 1. The surface area of thus obtained negative electrode was 8 cm$^2$, and the thickness was 139 μm. (The thickness of the current collector was 50 μm.)

The negative electrode of Embodiment 2 was evaluated in the same manner as Embodiment 1. As a result, discharge capacity at the second cycle was 373 mAh per 1 g of carbon, and discharge capacity at the 20th cycle was 359 mAh per 1 g of carbon.

EMBODIMENT 3

As main active materials for a negative electrode, exfoliated graphite (flaky, particle size of 8 μm, $d_{002}$=0.337 nm, Lc=17 nm, La=12 nm, R=0.1, specific surface area of 9 m$^2$/g) was used. The exfoliated graphite and copper (II) oxide (having a particle size of 15 μm) were mixed and formed into the weight ratio of 9:1, and then a negative electrode was fabricated in the same manner as Embodiment 1. The obtained negative electrode had a surface area of 8 cm$^2$ and a thickness of 81 μm. (The thickness of current collector was 50 μm.)

The negative electrode in Embodiment 3 was evaluated in the same manner as Embodiment 1. As a result, discharge capacity at the second cycle was 467 mAh per 1 g of carbon and discharge capacity at the 20th cycle was 412 mAh per 1 g of carbon.

EMBODIMENT 4

As a main active material for a negative electrode, exfoliated graphite the same as that used in Embodiment 3 was used. The exfoliated graphite and copper (I) oxide (particle size of 34 μm) were mixed and formed into the weight ratio of 9.6:0.4, and then a negative electrode was fabricated according to the same method as in Embodiment 1. Thus obtained negative electrode had a surface area of 8 m$^2$ and a thickness of 125 μm. (The thickness of the current collector was 50 μm.)

The negative electrode according to Embodiment 4 was then evaluated according to the same method as Embodiment 1. As a result, discharge capacity at the second cycle was 427 mAh per 1 g of carbon and discharge capacity at the 20th cycle was 398 mAh per 1 g of carbon.

COMPARISON EXAMPLE 1

In this example, a negative electrode was manufactured using natural graphite produced in Madagascar according to a method substantially identical to Embodiment 1 with a difference being that copper (II) of oxide was not mixed therein. The resulting negative electrode had a surface area of 8 cm² and a thickness of 130 m. (The thickness of current collector was 50 μm.)

The negative electrode of Comparison Example 1 was evaluated in the same manner as Embodiment 1. As a result, discharge capacity at the second cycle was 349 mAh per 1 of carbon and discharge capacity at the 20th cycle was 338 mAh per 1 g of carbon.

COMPARISON EXAMPLE 2

As graphite particles, exfoliated graphite (flaky, particle size=8 μm, $d_{002}$=0.337 nm, Lc=17 nm, La=12 nm, R=0.1, specific surface area=9 m²/g) was used. The exfoliated graphite and commercially available copper particles (having a particle size of 50 μm) were mixed into the weight ratio of 9:1, and then a negative electrode was manufactured according to a method similar to Embodiment 1. The resulting negative electrode had a surface area of 8 cm² and a thickness of 93 μm (the thickness of the current collector was 50 μm).

The negative electrode of Comparison Example 2 was evaluated similarly to the case of Embodiment 1. As a result, discharge capacity at the second cycle was 350 mAh per 1 g of carbon, and discharge capacity at the 20th cycle was 323 mAh per 1 g of carbon.

In Table 1, results of Embodiments 1 to 4 and Comparison Examples 1 and 2 are shown. If the results of Embodiments 1 to 4 and the result of Comparison Examples 1 and 2 are compared, it should be noted that negative electrodes formed with a mixture of graphite and copper oxide have increased discharge capacity.

TABLE 1

| | Graphite | | | | | | | | Copper Oxide | | Weight Ratio of | Discharge | |
| | | | | | | | | | | | Graphite | Capacitance (mAh/g) | |
| | Kind | Form | Particle Distribution (μm) | Interlayer Distance (nm) | Lc (nm) | La (nm) | R Value | Specific Surface Area (m²/g) | Kind | Particle Size (μm) | to Copper Oxide | 2nd Cycle | 20th Cycle |
|---|---|---|---|---|---|---|---|---|---|---|---|---|---|
| Embodiment 1 | Natural Graphite | Flaky | 11 | 0.337 | 27 | 17 | 0 | 8 | Copper (II) Oxide | 27 | 9.5:0.5 | 398 | 385 |
| Embodiment 2 | Natural Graphite | Flaky | 11 | 0.337 | 27 | 17 | 0 | 8 | Copper (I) Oxide | 34 | 9.6:0.4 | 373 | 359 |
| Embodiment 3 | Exfoliated Graphite | Flaky | 8 | 0.337 | 17 | 12 | 0.1 | 9 | Copper (II) Oxide | 15 | 9:1 | 467 | 412 |
| Embodiment 4 | Exfoliated Graphite | Flaky | 8 | 0.337 | 17 | 12 | 0.1 | 9 | Copper (I) Oxide | 34 | 9.6:0.4 | 427 | 398 |
| Comparison Example 1 | Natural Graphite | Flaky | 11 | 0.337 | 27 | 17 | 0 | 8 | — | — | 10:0 | 349 | 338 |
| Comparison Example 2 | Exfoliated Graphite | Flaky | 8 | 0.337 | 17 | 12 | 0.1 | 9 | (Copper) | 50 | (C:Cu = 9:1) | 350 | 323 |
| Embodiment 5 | Exfoliated Graphite | Flaky | 17 | 0.337 | 22 | 15 | 0.1 | 9 | Copper (II) Oxide | 52 | 9.4:0.6 | 378 | 365 |
| Embodiment 6 | Artificial Graphite | Flaky | 35 | 0.336 | 22 | 13 | 0 | 4 | Copper (II) Oxide | 23 | 9.5:0.5 | 370 | 352 |
| Embodiment 7 | Artificial Graphite | Spherical | 6 | 0.339 | 25 | 13 | 0.4 | 8 | Copper (II) Oxide | 15 | 9.2:0.8 | 369 | 355 |
| Comparison Example 3 | Carbon | Spherical | 6 | 0.349 | 1.3 | — | 1.3 | 1 | Copper (II) Oxide | 23 | 9.3:0.7 | 135 | 122 |
| Embodiment 8 | Artificial Graphite | Flaky | 77 | 0.337 | 26 | 14 | 0.1 | 2 | Copper (II) Oxide | 23 | 9.5:0.5 | 378 | 365 |
| Com- | Artificial | Flaky | 117 | 0.337 | 25 | 17 | 0.1 | 1 | Copper | 23 | 9.4:0.6 | 305 | 288 |

TABLE 1-continued

| | Graphite | | | | | | | | Copper Oxide | | Weight Ratio of | Discharge Capacitance (mAh/g) | |
|---|---|---|---|---|---|---|---|---|---|---|---|---|---|
| | Kind | Form | Particle Distribution ($\mu$m) | Interlayer Distance (nm) | Lc (nm) | La (nm) | R Value | Specific Surface Area ($m^2/g$) | Kind | Particle Size ($\mu$m) | Graphite to Copper Oxide | 2nd Cycle | 20th Cycle |
| parison Example 4 | Graphite | | | | | | | | (II) Oxide | | | | |

EMBODIMENT 5

As main active material for a negative electrode, exfoliated graphite (flaky, particle size of 17 $\mu$m, $d_{002}$=0.337 nm, Lc=22 nm, La=15 nm, R=0.1, specific surface area of 9 $m^2/g$) and copper (II) oxide (particle size of 52 $\mu$m) were mixed into the weight ratio of 9.4:0.6, and a negative electrode was fabricated in the same manner as Embodiment 1. Thus, the surface area of the obtained negative electrode was 8 $cm^2$, and the thickness was 178 $\mu$m. (The thickness of current collector was 50 $\mu$m.)

The negative electrode of Embodiment 5 was evaluated in the same manner as Embodiment 1 and it was found that discharge capacity at the second cycle was 378 mAh per 1 g of carbon and discharge capacity at the 20th cycle was 365 mAh per 1 g of carbon.

EMBODIMENT 6

As main active materials for a negative electrode, artificial graphite (flaky, particle size of 35 $\mu$m, $d_{002}$=0.336 nm, Lc=22 nm, La=13 nm, R=0, specific surface area of 4 $m^2/g$) and copper (II) oxide (particle size of 23 $\mu$m) were mixed into the weight ratio of 9.5:0.5, and a negative electrode was fabricated in the same manner as Embodiment 1. The surface area of the obtained negative electrode was 8 $cm^2$ and the thickness was 135 $\mu$m. (The thickness of current collector was 50 $\mu$m.)

The negative electrode of Embodiment 6 was evaluated in the same manner as Embodiment 1, and it was found that discharge capacity at the second cycle was 370 mAh per 1 g of carbon and discharge capacity at the 20th cycle was 352 mAh per 1 g of carbon.

EMBODIMENT 7

Artificial graphite (spherical, particle size of 6 $\mu$m, $d_{002}$=0.339 nm, Lc=25 nm, La=13 nm, R=0.4, and specific surface area of 8 $m^2/g$) and copper (II) oxide (particle size of 15 $\mu$m) were mixed into the weight ratio of 9.2:0.8, and a negative electrode was fabricated according to the same method as Embodiment 1. The surface area of the obtained negative electrode was 8 $cm^2$, and the thickness was 92 $\mu$m. (The thickness of the current collector was 50 $\mu$m.)

The negative electrode of Embodiment 7 was evaluated according to a method substantially identical to Embodiment 1 with a difference being the used electrolytic solution was prepared by dissolving 1 mol/l lithium perchlorate in a solvent of ethylene carbonate, propylene carbonate and diethyl carbonate mixed in the ratio of 2:1:2. As a result, discharge capacity at the second cycle was 369 mAh per 1 g of carbon, and discharge capacity at the 20th cycle was 355 mAh per 1 g of carbon.

COMPARISON EXAMPLE 3

Mesocarbon micro beads (spherical particle size of 6 $\mu$m, $d_{002}$=0.349 nm, Lc=1.2 nm, La unable to measure, R=1.3, specific surface area of 1 $m^2/g$) carbonized at 1000° C. and copper (II) oxide (particle size of 23 $\mu$m) were mixed in the weight ratio of 9.3:0.7, and a negative electrode was fabricated according to a method the same as Embodiment 1. The surface area of the resulting negative electrode was 8 $cm^2$, and the thickness was 105 $\mu$m. (The thickness of the current collector was 50 $\mu$m.)

The electrode of this example was evaluated according to the same method as Embodiment 1, and it was found that discharge capacity at the second cycle was 135 mAh per 1 g of carbon and discharge capacity at the 20th cycle was 122 mAh per 1 g of carbon.

Results of Embodiments 5 to 7 and Comparison Example 3 are also shown in Table 1. In the result of Embodiments 1 to 7 and Comparison Example 3, it is appreciated that negative electrodes containing a mixture of graphite and copper oxide exhibit higher discharge capacity than negative electrodes containing a mixture of mesocarbon micro beads (which is not graphite) and copper oxide.

EMBODIMENT 8

Artificial graphite (flaky, particle size=77 $\mu$m, $d_{002}$=0.337 nm, Lc=26 nm, La=14 nm, R=0.1, specific surface area=2 $m^2/g$) and copper (II) oxide (having a particle size of 23 $\mu$m) were mixed into the weight ratio of 9.5:0.5 and a negative electrode was fabricated according to the same method as Embodiment 1. The surface are of the resultant negative electrode was 8 $cm^2$, and the thickness was 205 $\mu$m. (The thickness of the current collector was 50 $\mu$m.)

The negative electrode of Embodiment 8 was evaluated according to the same method as Embodiment 1 and it was found out that discharge capacity at the second cycle was 378 mAh per 1 g of carbon and discharge capacity at the 20th cycle was 365 mAh per 1 g of carbon.

COMPARISON EXAMPLE 4

Artificial graphite (flaky, particle size=117 $\mu$m, $d_{002}$=0.337 nm, Lc=25 nm, La=17 nm, R=0.1, specific surface area=1 $m^2/g$) and copper (II) oxide (having a particle size of 23 $\mu$m) were mixed into the weight ratio of 9.4:0.9, and a negative electrode was fabricated according to the same method as Embodiment 1. The surface area of the resulting negative electrode was 8 $cm^2$ and the thickness was 278 $\mu$m. (The thickness of the current collector was 50 $\mu$m.) The negative electrode of this example was evaluated according to the same method as Embodiment 1, and it was found out that discharge capacity at the second cycle was 305 mAh per 1 g of carbon and discharge capacity at the 20th cycle was 288 mAh per 1 g of carbon.

Embodiment 8 and Comparison Example 4 were shown in Table 1. As can be seen from Embodiments 1 to 8 and Comparison Example 4, the particle size of graphite is preferably at most 80 μm.

EMBODIMENT 9

Natural graphite produced in Madagascar and copper (II) oxide (having a particle size of 27 μm) were mixed into the weight ratio of 9.5:0.5. Then, a nonionic dispersing agent and a polytetrafluoroethylene-dispersed solution were added to the mixture of graphite and copper (II) oxide (after dried, the mixture of graphite and copper (II) oxide and polytetrafluoroethylene were mixed in the weight ratio of 76:24) and formed into paste. The paste was applied onto a porous current collector of nickel, filling the pores of the collector. The paste-applied current collector was dried at 60° C., heat-treated at 240° C., then pressed and dried under reduced pressure at 200° C. for removal of water in order to form a negative electrode. The resulting negative electrode had a surface area of 4 cm$^2$ and a thickness of 378 μm.

In order to evaluate the negative electrode of Embodiment 9, a lead was connected to the nickel porous current collector and an evaluation was performed according to the same method as Embodiment 1. As a result, discharge capacity at the second cycle was 363 mAh per 1 g of carbon and discharge capacity at the 20th cycle was 348 mAh per 1 g of carbon.

COMPARISON EXAMPLE 5

A negative electrode was manufactured according to a method substantially identical to Embodiment 9 with a difference being that the weight ratio of the mixture of graphite and copper (II) oxide and polytetrafluoroethylene was 62:38 after dried. The resulting negative electrode had a surface area of 4 cm$^2$ and a thickness of 405 μm.

The negative electrode of Comparison Example 5 was evaluated in the same manner as Embodiment 9. As a result, discharge capacity at the second cycle was 285 mAh per 1 g of carbon and discharge capacity at the 20th cycle was 253 mAh per 1 g of carbon.

EMBODIMENT 10

A negative electrode was manufactured according to a method substantially identical to Embodiment 1 with a difference being that the weight ratio of the mixture of graphite and copper (II) oxide to polytetrafluoroethylene was 97:3 after dried. The resulting negative electrode had a surface area of 8 cm$^2$ and a thickness of 115 μm. (The thickness of the current collector was 50 μm.) The negative electrode of Embodiment 10 was evaluated in the same manner as Embodiment 1, and it was found that discharge capacity at the second cycle was 395 mAh per 1 g of carbon and discharge capacity at the 20th cycle was 361 mAh per 1 g.

COMPARISON EXAMPLE 6

A negative electrode was fabricated according to a method substantially identical to Embodiment 1 with a difference being that the weight ratio of the mixture of graphite and copper (II) oxide to polytetrafluoroethylene was 99.5:0.5 after dried. In thus fabricated negative electrode of Comparison Example 6, the mixture of graphite and copper (II) oxide came off from the current collector.

Results of Embodiments 9 and 10, and Comparison Examples 5 and 6 were set forth in Table 2. As can be seen from the results shown in Table 2 and the results of Embodiments 1 to 8 shown in Table 1, the weight ratio of a mixture of graphite and copper oxide to a binder is preferably within the range of 99:1 to 70:30.

TABLE 2

| | Weight Ratio of Graphite to Copper | Weight Ratio of (Graphite + Copper Oxide) to PTFE | Discharge Capacitance (mAh/g) | | Remarks |
|---|---|---|---|---|---|
| | | | 2nd Cycle | 20th Cycle | |
| Embodiment 9 | 9.5:0.5 | 76:24 | 363 | 348 | |
| Comparison Example 5 | 9.5:0.5 | 62:38 | 285 | 253 | |
| Embodiment 10 | 9.5:0.5 | 97:3 | 395 | 361 | |
| Comparison Example 6 | 9.5:0.5 | 99.5:0.5 | — | — | fall off |

*PTFE: polytetrafluoroethylene

Artificial graphite (flaky, particle size=7 μm, $d_{002}$=0.336 nm, Lc=22 nm, La=13 nm, R=0.1, and specific surface area=10 m$^2$/g) and copper (II) oxide (having a particle size of 27 μm) were mixed into the weight ratio of 9.1:0.9. The mixture of graphite and copper (II) oxide was mixed with a solution containing N, N-dimethylformamide and polyvinylidene fluoride in the weight ratio of 1.5:0.05 and formed into paste (the weight ratio of graphite, copper (II) oxide and polyvinylidene fluoride was 91:9 after dried.) The paste was applied onto both sides of a stainless current collector. The paste-applied current collector was dried at 65° C., heat-treated at 155° C. then pressed and dried at 160° C. under reduced pressure for removal of water, in order to form a negative electrode. The resulting negative electrode had a surface area of 8 cm$^2$ and a thickness of 113 μm. (The thickness of the current collector was 50 μm.)

The negative electrode of Embodiment 11 was evaluated according to the same method as Embodiment 1. As a result, discharge capacity at the second cycle was 383 mAh per 1 g of carbon and discharge capacity at the 20th cycle was 362 mAh per 1 g of carbon.

EMBODIMENT 12

The artificial graphite and copper (II) oxide the same as those in Embodiment 11 were mixed into the weight ratio of 9.2:0.8. The mixture of graphite and copper (II) oxide and polyethylene powder were mixed into the weight ratio of 89:11 and filled within pores of a nickel porous current collector. The current collector having the mixture of graphite, copper (II) oxide and polyethylene applied was heated at 125° C. pressed and then dried at 110° C. under reduced pressure for removal of water in order to form a negative electrode. Thus formed negative electrode had a surface area of 4 cm$^2$ and a thickness of 334 μm.

The negative electrode of Embodiment 12 was evaluated according to the same method as Embodiment 9. As a result, discharge capacity at the second cycle was 368 mAh per 1 g of carbon, and discharge capacity at the 20th cycle was 351 mAh per 1 g of carbon.

EMBODIMENT 13

A negative electrode was manufactured according to the same method as Embodiment 1 with a difference being that exfoliated graphite (flaky, particle size=8 μm, $d_{002}$=0.337 nm, Lc=17 nm, La=12 nm, R=0.1, specific surface area=9m²/g) and copper (II) oxide (having a particle size of 15 μm) were mixed into the weight ratio of 8:2. The resulting negative electrode had a surface area of 8 cm² and a thickness of 104 μm. (The thickness of the current collector was 50 μm.)

The negative electrode of Embodiment 13 was evaluated according to the same method as Embodiment 1, and it was found that discharge capacity at the second cycle was 408 mAh per 1 g of carbon and discharge capacity at the 20th cycle was 398 mAh per 1 g of carbon.

EMBODIMENT 14

A negative electrode was fabricated in the same manner as Embodiment 13 except that copper (II) oxide having a particle size of 23 μm was used. The resulting negative electrode had a surface area of 8 cm² and a thickness of 88 μm. (The thickness of the current collector was 50 μm.)

The negative electrode of Embodiment 14 was evaluated in the same manner as Embodiment 1, and it was found that discharge capacity at the second cycle was 403 mAh per 1 g of carbon and discharge capacity at the 20th cycle was 395 mAh per 1 g of carbon.

EMBODIMENT 15

A negative electrode was fabricated in the same manner as Embodiment 13 except that copper (II) oxide having a particle size of 35 μm was used. The resulting negative electrode had a surface area of 8 cm² and a thickness of 126 μm. (The thickness of the current collector was 50 μm.)

The negative electrode of Embodiment 15 was evaluated in the same manner as Embodiment 1 and it was found that discharge capacity at the second cycle was 402 mAh per 1 g of carbon and discharge capacity at the second cycle was 397 mAh per 1 g of carbon.

EMBODIMENT 16

A negative electrode was fabricated according to a method substantially identical to Embodiment 13 with a difference being that exfoliated graphite and copper (II) oxide (having a particle size of 23 μm) were mixed in the weight ratio of 9.8:0.2. The resulting negative electrode had a surface area of 8 cm² and a thickness of 86 μm. (The thickness of the current collector was 50 μm.)

The negative electrode of Embodiment 16 was evaluated in the same manner as Embodiment 1 and it was found that discharge capacity at the second cycle was 384 mAh per 1 g of carbon and discharge capacity at the 20th cycle was 361 mAh per 1 g of carbon.

EMBODIMENT 17

A negative electrode was fabricated according to a method substantially identical to Embodiment 13 with a difference being that the weight ratio of exfoliated graphite and copper (II) oxide (having a particle size of 23 μm) was 9.5:0.5. The resulting negative electrode had a surface area of 8 cm² and a thickness of 97 μm. (The thickness of the current collector was 50 μm.)

The negative electrode of Embodiment 17 was evaluated in the same manner as Embodiment 1, and it was found that discharge capacity at the second cycle was 393 mAh per 1 g of carbon and discharge capacity at the 20th cycle was 358 mAh per 1 g of carbon.

EMBODIMENT 18

A negative electrode was fabricated according to a method substantially identical to Embodiment 13 with a difference being that the weight ratio of exfoliated graphite and copper (II) oxide having (a particle size of 23 μm) was 9:1. The resulting negative electrode had a surface area of 8 cm² and a thickness of 81 μm. (The thickness of the current collector was 50 μm.)

The negative electrode of Embodiment 18 was evaluated in the same manner as Embodiment 1, and it was found that discharge capacity at the second cycle was 467 mAh per 1 g of carbon and discharge capacity at the 20th cycle was 412 mAh per 1 g of carbon.

EMBODIMENT 19

A negative electrode was fabricated according to a method substantially identical to Embodiment 13 with a difference being that the weight ratio of exfoliated graphite and copper (II) oxide (having a particle size of 23 μm) was 6:4. The resulting negative electrode had a surface area of 8 cm² and a thickness of 89 μm. (The thickness of the current collector was 50 μm.)

The negative electrode of Embodiment 19 was evaluated in the same manner as Embodiment 1, and it was found that discharge capacity at the second cycle was 433 mAh per 1 g of carbon and discharge capacity at the 20th cycle was 407 mAh per 1 g of carbon.

EMBODIMENT 20

A negative electrode was fabricated according to a method substantially identical to Embodiment 13 with a difference being that the weight ratio of exfoliated graphite and copper (II) oxide (having a particle size of 23 μm) was 5:5. The resulting negative electrode had a surface area of 8 cm² and a thickness of 91 μm. (The thickness of the current collector was 50 μm.)

The negative electrode of Embodiment 20 was evaluated in the same manner as Embodiment 1, and it was found that discharge capacity at the second cycle was 367 mAh per 1 g of carbon and discharge capacity at the 20th cycle was 352 mAh per 1 g of carbon.

EMBODIMENT 21

A negative electrode was fabricated according to a method substantially identical to Embodiment 13 with a difference being that the weight ratio of exfoliated graphite and copper (II) oxide (having a particle size of 23 m) was 4:6. The resulting negative electrode had a surface area of 8 cm² and a thickness of 111 μm. (The thickness of the current collector was 50 μm.)

The negative electrode of Embodiment 21 was evaluated in the same manner as Embodiment 1, and it was found that discharge capacity at the second cycle was 366 mAh per 1 g of carbon and discharge capacity at the 20th cycle was 346 mAh per 1 g of carbon.

COMPARISON EXAMPLE 7

A negative electrode was fabricated according to a method substantially identical to Embodiment 1 with a difference being that only exfoliated graphite was used without including copper oxide. The resulting negative electrode had a surface area of 8 cm$^2$ and a thickness of 107 μm. (The thickness of the current collector was 50 μm.)

The negative electrode of Comparison Example 7 was evaluated in the same manner as Embodiment 1, and it was found that discharge capacity at the second cycle was 352 mAh per 1 g of carbon and discharge capacity at the 20th cycle was 349 mAh per 1 g of carbon.

COMPARISON EXAMPLE 8

A negative electrode was fabricated according to a method substantially identical to Embodiment 13 with a difference being that the weight ratio of exfoliated graphite and copper (II) oxide (having a particle size of 23 μm) was 2:8. The resulting negative electrode had a surface area of 8 cm$^2$ and a thickness of 124 μm. (The thickness of the current collector was 50 μm.)

The negative electrode of Comparison Example 8 was evaluated in the same manner as Embodiment 1, and it was found that discharge capacity at the second cycle was 278 mAh per 1 g of carbon and discharge capacity at the 20th cycle was 250 mAh per 1 g of carbon.

COMPARISON EXAMPLE 9

A negative electrode was fabricated according to a method substantially identical to Embodiment 13 with a difference being that the weight ratio of exfoliated graphite and copper (II) oxide (having a particle size of 23 μm) was 1:9. The resulting negative electrode had a surface area of 8 cm$^2$ and a thickness of 124 μm. (The thickness of the current collector was 50 μm.)

The negative electrode of Comparison Example 9 was evaluated in the same manner as Embodiment 1, and it was found that discharge capacity at the second cycle was 237 mAh per 1 g of carbon and discharge capacity at the 20th cycle was 225 mAh per 1 g of carbon.

The results of Embodiments 13 to 21 and Comparison Examples 7 to 9 were shown in Table 3 and FIG. 1. In FIG. 1, the abscissa represents the weight ratio of graphite in the mixture of the graphite and copper oxide, and the ordinate represents discharge capacity per 1 g of graphite in the second cycle. As can be understood from FIG. 1, the weight ratio of graphite and copper oxide is preferably in the range from 9.8:0.2 to 4:6, more specifically in the range from 9.8:0.2 to 6:4.

TABLE 3

| | Copper Oxide Particle Size (μm) | Weight Ratio Graphite Graphite + Copper Oxide | Discharge Capacitance (mAh/g) 2nd Cycle | Discharge Capacitance (mAh/g) 20th Cycle |
|---|---|---|---|---|
| Embodiment 13 | 15 | 0.8 | 408 | 398 |
| Embodiment 14 | 23 | 0.8 | 403 | 395 |
| Embodiment 15 | 35 | 0.8 | 402 | 397 |
| Embodiment 16 | 23 | 0.98 | 384 | 361 |
| Embodiment 17 | 23 | 0.95 | 393 | 358 |
| Embodiment 18 | 23 | 0.9 | 467 | 412 |
| Embodiment 19 | 23 | 0.6 | 433 | 407 |
| Embodiment 20 | 23 | 0.5 | 367 | 352 |
| Embodiment 21 | 23 | 0.4 | 366 | 346 |
| Comparison Example 7 | — | 1 | 352 | 349 |
| Comparison Example 8 | 23 | 0.2 | 278 | 250 |
| Comparison Example 9 | 23 | 0.1 | 237 | 225 |

EMBODIMENT 22

Manufacture of Negative Electrode

Natural graphite produced in Madagascar and commercially available copper (II) oxide (having a particle size of 27 μm) were mixed into the weight ratio of 9.5:0.5 in a mortar. A nonionic dispersing agent and a polytetrafluoroethylene-dispersed solution were added to the mixture of the natural graphite and copper (II) oxide and formed into paste. (The weight ratio of the mixture of graphite and copper (II) oxide and polytetrafluoroethylene was 91:9 after dried.) The paste was filled within pores of a nickel porous current collector. The paste-applied nickel porous current collector was dried at 60° C., heat-treated at 240° C., then pressed and then dried at 200° C. under reduced pressure for removal of water, in order to form negative electrode. Thus obtained negative electrode was in a circular shape having a diameter of 14.5 mm and had a thickness of 0.41 mm.

Manufacture of Positive Electrode

Lithium oxide, cobalt carbonate and antimony trioxide were mixed in a mortar such that the atom ratio of lithium, cobalt, and antimony was 1:0.95:0.05. The mixture was baked in an atmosphere at 900° C. for 20 hours, and then ground in the mortar, and an active material was obtained in powder. The active material had a composition of $Li_{0.98}Co_{0.95}Sb_{0.05}O_2$. The active material for the positive electrode was mixed with acetylene black, with addition of a nonionic dispersing agent and a polytetrafluoroethylene-dispersed solution and formed into paste. (The weight ratio of the active materials, acetylene black and polytetrafluoroethylene was 100:10:5 after dried.) The paste was applied onto a titanium mesh current collector, dried at 60° C., heat-treated at 240° C., then pressed, and dried at 200° C. under reduced pressure for removal of water in order to form a positive electrode. Thus formed positive electrode had a circular plate shape with a diameter of 14.5 mm and a thickness of 0.93 mm.

Assembling of Battery

Figure 3:
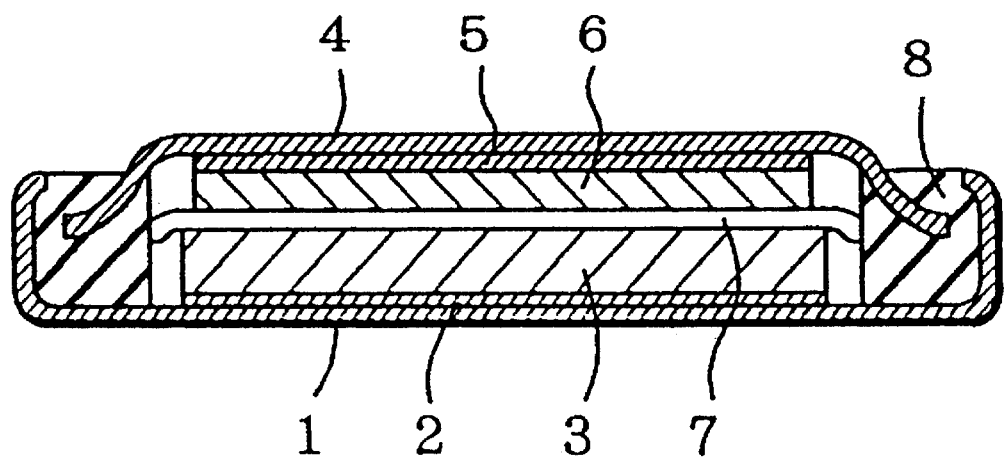
FIG. 3 is a cross sectional view schematically showing a lithium secondary battery according to an embodiment of the invention.

As illustrated in FIG. 3, a current collector for positive electrode 2 was welded onto the bottom of a can for positive electrode 1; and an insulating packing 8 was placed along the periphery. A positive electrode 3 was pressure-bonded on positive electrode current collector 2. Disposed on positive electrode 3 was a porous separator 7 of polypropylene, which was impregnated with an electrolytic solution in which 1 mol/l LiPF$_6$ was dissolved in a mixture solvent including ethylene carbonate, propylene carbonate and ethyl carbonate in the ratio of 2:1:3. Meanwhile, a current collector for negative electrode 5 was welded on the inner surface of a negative electrode can 4, and a negative electrode 6 was pressure-bonded on negative electrode current collector 5. Then, a coin type battery was manufactured by joining positive electrode can 1 and negative electrode can 4 through insulating packing 8 such that separator 7 and negative electrode 6 are in contact.

Evaluation of Battery

The resulting coin type battery was evaluated with a charge/discharge current of 2 mA. At the time of charging, once the charging voltage reaches 4.2 V, charging with a constant voltage of 4.2 V was performed, and time for charging was set for 12 hours. The capacity of the battery was measured for the lower limit voltage of 2.5 V at the time of discharge. Evaluation of the battery was performed by the discharge capacity of the battery.

As a result, mean voltage at the time of battery discharge in Embodiment 22 was 3.7 V, discharge capacity at the second cycle was 18 mAh and discharge capacity at the 10th cycle was 16 mAh.

COMPARISON EXAMPLE 10

A battery was manufactured according to a method substantially identical to Embodiment 22 except that copper (II) oxide was not included. The battery of this example was evaluated in the same manner as Embodiment 22, and it was found that mean voltage at the time of discharge was 3.7 V, discharge capacity at the second cycle was 14 mAh, and discharge capacity at the 10th cycle was 13 mAh.

EMBODIMENT 23

Manufacture of Negative Electrode

Exfoliated graphite (flaky, particle size=8 μm, $d_{002}$=0.337 nm, Lc=17.2 nm, La=12.5 nm, R=0.1, specific surface area=9.5 m$^2$/g) and copper (II) oxide (having a particle size of 15 μm) were mixed into the weight ratio of 9:1. The mixture of the exfoliated graphite and copper (II) oxide with addition of a nonionic dispersing agent and a polytetrafluoroethylene-dispersed solution was formed into paste. (The weight ratio of the mixture of graphite and copper (II) oxide and polytetrafluoroethylene was 91:9 after dried.) The paste was filled within pores of a nickel porous current collector, dried at 60° C., heat-treated at 240° C., then pressed and dried at 200° C. under reduced pressure for removal of water, in order to form a negative electrode. The manufactured electrode had a circular shape, a diameter of 14.5 mm and a thickness of 0.38 mm.

Manufacture of Positive Electrode

Lithium oxide and manganese dioxide were mixed in a mortar such that the atom ratio of lithium and manganese was 1.1:2. The mixture was baked in an atmosphere at 900° C. for three days and then ground into powder in the mortar. The composition of the powder available as an active material was $LiMn_2O_4$. The active material for the positive electrode was mixed with a conductive material which includes acetylene black and exfoliated graphite in the weight ratio of 2:1. The mixture with addition of a nonionic dispersing agent and a polytetrafluoroethylene dispersed solution was formed into paste. (The weight ratio of the positive electrode active material, the conductive material and polytetrafluoroethylene was 100:10:5 after dried.) The paste was applied onto a titanium mesh current collector, dried at 60° C., heat-treated at 240° C., then pressed and dried at 200° C. under reduced pressure for removal of water, in order to form a positive electrode. Thus formed positive electrode had a circular plate shape, a diameter of 14.5 mm and a thickness of 1.0 mm.

Assembling of Battery

A coin type battery was fabricated according to a method substantially identical to Embodiment 22 with a difference being that an electrolytic solution was prepared by dissolving 1 mol/l $LiPF_6$ in a mixture solvent containing ethylene carbonate, γ-butylolactone, and diethyl carbonate in the ratio of 3:1:3.

Evaluation of Battery

The coin type battery of Embodiment 23 was evaluated with a charge/discharge current of 1 mA. At the time of charging, once charge voltage reached 4.2 V, charging with a constant voltage of 4.2 V was conducted, and 24 hours was set for charging time. At the time of discharging, the capacity of the battery was measured for the lower limit voltage of 2.5 V. Evaluation of the battery was performed by the discharge capacity.

As a result, mean voltage at the time of discharge of the battery in Embodiment 23 was 3.7 V, discharge capacity at the second cycle was 15 mAh, and discharge capacity at the 10th cycle was 13 mAh.

COMPARISON EXAMPLE 11

A coin type battery substantially identical to Embodiment 23 was fabricated except that copper (II) oxide was not included in the negative electrode.

The battery of Comparison Example 11 was evaluated in the same manner as Embodiment 23 and it was found that mean voltage at the time of discharge was 3.7 V, discharge capacity at the second cycle was 13 mAh, and discharge capacity at the 10th cycle was 11 mAh.

Results of Embodiments 22 and 23 and Comparison Examples 10 and 11 were set forth in Table 4. As can be seen from Table 4, use of graphite containing copper oxide produces a lithium secondary battery with high capacity.

TABLE 4

| | Negative Electrode | | Discharge | |
| | Kind of Graphite | Weight Ratio of Graphite to Copper Oxide | Positive Electrode Active Material | Capacitance (mAh/g) | |
| --- | --- | --- | --- | --- | --- |
| | | | | 2nd Cycle | 10th Cycle |
| Embodiment 22 | Natural Graphite | 9.5:0.5 | $Li_{0.98}Co_{0.95}Sb_{0.05}O_2$ | 18 | 16 |
| Comparison Example 10 | Natural Graphite | 10:0 | $Li_{0.98}Co_{0.95}Sb_{0.05}O_2$ | 14 | 13 |
| Embodiment 23 | Exfoliated Graphite | 9:1 | $LiMn_2O_4$ | 15 | 13 |
| Comparison Example 11 | Exfoliated Graphite | 10:0 | $LiMn_2O_4$ | 13 | 11 |

EMBODIMENT 24

Manufacture of Graphite Composite Powder Coated with Copper Oxide

In order to produce graphite composite particles coated with copper (II) oxide on the entire surface or part of the surface, natural graphite produced in Madagascar (flaky, particle size=11 µm, $d_{002}$=0.337 nm, Lc=27 nm, La=17 nm, R=0, specific surface area=8 m$^2$/g) was used. The natural graphite powder was subjected to electroless plating as follows.

The graphite powder was first soaked in ether alcohol, then in a sensitizing agent (a mixture solution of 30 g/l $SnCl_2 \cdot 2H_2O$ and 20 ml/l concentrated hydrochloric acid), and then in an activating agent (a mixture solution of 0.4 g/l $PbCl_2 \cdot 2H_2O$ and 3 ml/l concentrated hydrochloric acid) for pretreatment. The pretreated graphite powder was placed in an electroless plating bath in which a solution containing 10 g/l $CuSO_4 \cdot 5H_2O$, 50 g/l potassium sodium tartrate, 10 g/l sodium hydroxide, and 10 ml/l of 37% formalin is prepared into pH=12.0 with sodium hydroxide, and the plating solution was stirred with a stirrer in a room temperature while the graphite powder was plated with copper. The copper-plated graphite powder was dried at 60° C. and the weight ratio of graphite and copper was 83:17. The graphite powder coated with copper was oxidized at 250° C. for five hours in air and graphite composite powder coated with copper oxide resulted. The graphite composite powder coated with copper oxide was measured through wide angle X-ray diffraction, and a X-ray diffraction pattern related with graphite and copper (II) oxide were observed.

Manufacture of Negative Electrode

Graphite composite powder coated with copper oxide with addition of a nonionic dispersing agent and polytetrafluoroethylene-dispersed solution was formed into paste. (The weight ratio of graphite composite powder and polytetrafluoroethylene was 87:13 after dried.) The paste was applied onto both sides of a copper foil current collector, dried at 60° C., heat-treated at 240° C., then pressed and dried at 200° C. under reduced pressure for removal of water, in order to form a negative electrode. The resulting electrode had a surface area of 8 cm$^2$ and a thickness of 75 µm. (The thickness of the current collector was 50 µm.)

Evaluation of Negative Electrode

The negative electrode of Embodiment 24 was evaluated according to a method substantially identical to Embodiment 1 except that charging up to 0 V at a current density of 0.1 mA/cm$^2$ was conducted, followed by discharging to 1.5 V.

As a result, in the negative electrode of Embodiment 24, discharge capacity at the second cycle was 458 mAh per unit volume of the electrode (hereinafter the unit volume of electrode does not include the volume of a current collector), and discharge capacity at the 10th cycle was 421 mAh.

EMBODIMENT 25

Denatured graphite (flaky, particle size=8 µm, $d_{002}$=0.337 nm, Lc=17 nm, La=12 nm, R=0.1, specific surface area=9 m$^2$/g) was used as graphite particles. The denatured graphite particles were plated at 75° C. in an electroless copper plating bath in which a solution containing 0.06 mol/l $CuSO_4 \cdot 5H_2O$, 0.3 mol/l EDTA (ethylenediaminetetraacetic acid), 0.4 mol/l formaldehyde, and 170 mg/l of 7-iodo-8-hydroxyquinoline-5-sulfonic acid is prepared into pH=12.8 with sodium hydroxide. The weight ratio of graphite and copper in the copper-plated graphite powder was 85:15. Then, graphite composite powder coated with copper oxide was fabricated according to a method substantially identical to Embodiment 24 except that the copper-plated graphite powder was oxidized at 400° C. for 30 minutes in air. The resulting graphite composite powder was proved to be formed of graphite and copper (II) oxide through wide angle X-ray diffraction measurement. A negative electrode was fabricated in the same manner as Embodiment 24 with the graphite composite powder. The resulting negative electrode had a surface area of 8 cm$^2$ and a thickness of 71 µm. (The thickness of the current collector was 50 µm.)

The negative electrode of Embodiment 25 was evaluated in the same manner as Embodiment 24, and it was found that discharge capacity at the second cycle was 462 mAh per unit volume of the electrode, and discharge capacity at the 10th cycle was 435 mAh.

EMBODIMENT 26

As graphite particle, the denatured graphite (flaky, particle size=17 µm, $d_{002}$=0.337 nm, Lc=22 nm, La=15 nm, R=0.1, specific surface area=9 m$^2$/g) was used. The denatured graphite particle was plated in an electroless copper plating bath in which a solution containing 15 g/l $Cu(NO_3)_2 \cdot 3H_2O$, 10 g/l sodium hydrogen carbonate, 30 g/l potassium sodium tartrate, 20 g/l sodium hydroxide and 100 ml/l of 37% formalin was prepared into pH=11.5 with sodium hydroxide. The weight ratio of graphite and copper in the copper-plated graphite powder was 91:9. Graphite composite powder coated with copper oxide was manufactured in the same manner as Embodiment 24 except that the copper-plated graphite powder was oxidized at 200° C. for 24 hours in oxygen. The graphite composite powder was proved to be formed of graphite and copper (II) oxide through wide angle X-ray diffraction measurement. With the resulting graphite composite powder, a negative electrode was fabricated in the same manner as Embodiment 24. The resulting negative electrode had a surface area of 8 cm² and a thickness of 88 μm. (The thickness of the current collector was 50 μm.)

The negative electrode of Embodiment 26 was evaluated in the same manner as Embodiment 24, and it was found that discharge capacity at the second cycle was 439 mAh per unit volume of the electrode, and discharge capacity at the 10th cycle was 415 mAh.

EMBODIMENT 27

As graphite particles, artificial graphite (flaky, particle size=35 μm, $d_{002}$=0.336 nm, Lc=22 nm, La=13 mm, R=0, specific surface area=4 m²/g). The artificial graphite particles were plated in an electroless copper plating bath obtained by mixing a solution containing 60 g/l $CuSO_4.5H_2O$, 15 g/l $NiSO_4.7H_2O$ and 45 g/l hydrazine sulfate, and a solution containing 180 g/l potassium sodium tartrate, 45 g/l sodium hydroxide, and 15 g/l sodium carbonate immediately before use. The weight ratio of graphite and copper in the copper-plated graphite powder was 89:11. Graphite composite powder coated with copper oxide was fabricated in the same manner as Embodiment 24 except that the copper-plated graphite powder was oxidized at 350° C. for 1 hour in air. The fabricated graphite composite powder was proved to be formed of graphite and copper (II) oxide through wide angle X-ray diffraction measurement. With thus obtained graphite composite powder, a negative electrode was fabricated in the same manner as Embodiment 24. The resulting negative electrode had a surface area of 8 cm² and a thickness of 132 μm. (The thickness of the current collector was 50 μm.)

The negative electrode of Embodiment 27 was evaluated in the same manner as Embodiment 24, and it was found that discharge capacity at the second cycle was 402 mAh per unit volume of the electrode, and discharge capacity at the 10th cycle was 388 mAh.

EMBODIMENT 28

As graphite particles, artificial graphite (spherical, particle size=6 μm, $d_{002}$=0.339 nm, Lc=25 nm, La=13 nm, R=0.4, specific surface area=8 m²/g) was used. The artificial graphite particles were pretreated with MAC-100 and MAC-200 (manufactured by OKUNOSEIYAKU KOGYO KABUSHIKI KAISHA) and plated in an electroless copper plating bath using two kinds of solutions, MAC-500A and MAC-500B (manufactured by OKUNOSEIYAKU KOGYO KABUSHIKI KAISHA). The weight ratio of graphite and copper in the copper-plated graphite powder was 96:4. Then, graphite composite powder coated with copper oxide was fabricated according to a method substantially identical to Embodiment 24 with an essential difference being that the copper-plated graphite powder was oxidized in water containing dissolved oxygen at 70° C. for 15 hours. The resulting graphite composite powder was proved to be formed of graphite, copper (I) oxide and copper (II) oxide through wide angle powder X-ray diffraction measurement. With graphite composite powder, a negative electrode was fabricated in the same manner as Embodiment 24. The resulting negative electrode had a surface area of 8 cm² and a thickness of 71 μm. (The thickness of the current collector was 50 μm.) The negative electrode of Embodiment 28 was evaluated in the same manner as Embodiment 24 except that the electrolytic solution was prepared by dissolving 1 mol/l lithium perchlorate in a mixture solvent containing ethylene carbonate, propylene carbonate, and diethyl carbonate in the ratio of 2:1:2. As a result, discharge capacity at the second cycle was 425 mAh per unit volume of the electrode and discharge capacity at the 10th cycle was 398 mAh.

COMPARISON EXAMPLE 12

A negative electrode was fabricated in the same manner as Embodiment 24 except that the graphite particles were not copper-plated. The resulting negative electrode had a surface area of 8 cm² and a thickness of 85 μm. (The thickness of the current collector was 50 μm.)

The negative electrode of Comparison Example 12 was evaluated in the same manner as Embodiment 24 except that the used current density was 30 mAh/g. As a result, discharge capacity at the second cycle was 358 mAh per unit volume of the electrode and discharge capacity at the 10th cycle was 344 mAh.

COMPARISON EXAMPLE 13

As carbon particles, methocarbon micro beads carbonated at 1000° C. (spherical, particle size=6 μm, $d_{002}$=0.349 nm, Lc=1.3 nm, La (unable to measure), R=1.3, specific surface area=1 m²/g) were used. The carbon particles were pretreated with MAC-100 and MAC-200, and plated in an electroless copper plating bath using two kinds of solutions, MAC-500A and MAC-500B. The weight ratio of the graphite and copper in the copper-plated graphite powder was 81:19. Then, carbon composite powder coated with copper oxide was fabricated with the copper-plated carbon powder in the same manner as Embodiment 24. The resulting carbon composite powder was proved to be formed of carbon and copper (II) oxide through wide angle X-ray diffraction measurement. With the carbon composite powder, a negative electrode was fabricated in the same manner as Embodiment 24. The resulting negative electrode had a surface area of 8 cm² and a thickness of 68 μm. (The thickness of the current collector was 50 μm.)

The resulting negative electrode of Comparison Example 13 was evaluated in the same manner as Embodiment 24, and it was found that discharge capacity at the second cycle was 176 mAh per unit volume of the electrode, and discharge capacity at the 10th cycle was 159 mAh.

COMPARISON EXAMPLE 14

As graphite particles, artificial graphite (flaky, particle size=10 μm, $d_{002}$=0.336 nm, Lc>100 nm, La=17 nm, R=0, specific surface area=12 m²/g) was used. The artificial graphite particles were subjected to an electroless copper plating similarly to the case of Comparison Example 13. The electroless copper-plated graphite powder was washed with ethanol and then dried. The weight ratio of the graphite and copper in the copper-plated graphite powder was 90:10. The copper-plated graphite powder was proved to be formed of graphite and copper through wide angle X-ray diffraction measurement. A negative electrode was fabricated in the same manner as Embodiment 24 except that the copper layer of the copper-plated graphite powder was not oxidized. The resulting negative electrode had a surface area of 8 cm² and a thickness of 71 μm. (The thickness of a current collector was 50 μm.)

The negative electrode of Comparison Example 14 was evaluated in the same manner as Embodiment 24, and it was found that discharge capacity at the second cycle was 358 mAh per unit volume of the electrode (348 mAh per 1 g of carbon) and discharge capacity at the 10th cycle was 339 mAh per unit volume of the electrode (329 mAh per 1 g of carbon).

Results obtained in Embodiments 24 to 28 and Comparison Examples 12 and 14 were set forth in Table 5. As can be seen from these results, negative electrodes containing graphite composite powder coated with copper oxide can achieve high discharge capacity.

COMPARISON EXAMPLE 15

Graphite powder coated with copper oxide was fabricated according to a method substantially identical to Embodiment 29 except that as graphite particles, artificial graphite (flaky, particle size=117 μm, $d_{002}$=0.337 nm, Lc=25 nm, La=17 nm, R=0.1, specific surface area=1 $m^2$/g) was used. The weight ratio of graphite and copper in the copper-plated graphite powder was 88:12. The graphite composite powder coated with copper oxide was proved to be formed of graphite and copper (II) oxide through wide angle X-ray diffraction measurement. With the resulting graphite composite powder, a negative electrode was fabricated in the same manner

TABLE 5

| | Graphite | | | | | | | Weight Ratio of | Discharge Capacitance (mAh/g) | |
|---|---|---|---|---|---|---|---|---|---|---|
| | Kind | Form | Particle Size (μm) | Interlayer Distance (nm) | Lc (nm) | La (nm) | R Value | Specific Surface Area ($m^2$/g) | Graphite to Copper Oxide | 2nd Cycle | 20th Cycle |
| Embodiment 24 | Natural Graphite | Flaky | 11 | 0.337 | 27 | 17 | 0 | 8 | 83:17 | 458 | 421 |
| Embodiment 25 | Denatured Graphite | Flaky | 8 | 0.337 | 17 | 12 | 0.1 | 9 | 85:15 | 462 | 435 |
| Embodiment 26 | Denatured Graphite | Flaky | 17 | 0.337 | 22 | 15 | 0.1 | 9 | 91:9 | 439 | 415 |
| Embodiment 27 | Artificial Graphite | Flaky | 35 | 0.336 | 22 | 13 | 0 | 4 | 89:11 | 402 | 388 |
| Embodiment 28 | Artificial Graphite | Spherical | 6 | 0.339 | 25 | 13 | 0.4 | 8 | 96:4 | 425 | 398 |
| Comparison Example 12 | Natural Graphite | Flaky | 11 | 0.337 | 27 | 17 | 0 | 8 | 10:0 | 358 | 344 |
| Comparison Example 13 | Carbon | Spherical | 6 | 0.349 | 1.3 | — | 1.3 | 1 | 81:19 | 176 | 159 |
| Comparison Example 14 | Artificial Graphite | Flaky | 10 | 0.336 | >100 | 17 | 0 | 12 | 90.10 | 358 | 339 |
| Embodiment 29 | Artificial Graphite | Flaky | 77 | 0.337 | 26 | 14 | 0.1 | 2 | 87.13 | 374 | 351 |
| Comparison Example 15 | Artificial Graphite | Flaky | 117 | 0.337 | 25 | 17 | 0.1 | 1 | 88.12 | 361 | 337 |

EMBODIMENT 29

As graphite particles, artificial graphite (flaky, particle size=77 μm, $d_{002}$=0.337 nm, Lc=26 nm, La=14 nm, R=0.1, specific surface area=2 $m^2$/g) was used. The artificial graphite particles were pretreated with MAC-100 and MAC-200, and plated in an electroless copper plating bath using two kinds of solutions, MAC-500A and MAC-500B. The weight ratio of graphite and copper in the copper-plated graphite powder was 87:13. Graphite composite powder coated with copper oxide was fabricated in the same manner as Embodiment 24 using the copper-plated graphite powder. The graphite composite powder was proved to be formed of graphite and copper (II) oxide through wide angle X-ray diffraction measurement. Then, with the resulting graphite composite powder, a negative electrode was fabricated in the same manner as Embodiment 24. The resulting negative electrode had a surface area of 8 $cm^2$ and a thickness of 227 μm. (The thickness of the current collector was 50 μm.)

The negative electrode of Embodiment 29 was evaluated similarly to the case of Embodiment 24 except that the used current density was 0.05 mA/$cm^2$. As a result, discharge capacity at the second cycle was 374 mAh per unit volume of the electrode, and discharge capacity at the 10th cycle was 351 mAh.

as Embodiment 24. The resulting negative electrode had a surface area of 8 $cm^2$ and a thickness of 305 μm. (The thickness of the current collector was 50 μm.)

The negative electrode of Comparison Example 15 was evaluated similarly to the case of Embodiment 24 except that the used current density was 0.05 mA/$cm^2$. As a result, discharge capacity at the second cycle was 361 mAh per unit volume of the electrode, and discharge capacity at the 10th cycle was 337 mAh.

Results in Embodiment 29 and Comparison Example 15 were set forth in Table 5. As can be seen from the results of Embodiments 24 to 29 and Comparison Example 15 set forth in Table 5, the particle size of graphite is preferably at most 80 μm.

EMBODIMENT 30

Graphite composite powder coated with copper oxide was fabricated according to a method substantially identical to Embodiment 29 with an essential difference being that natural graphite produced in Madagascar was used as graphite particles. The weight ratio of graphite and copper in the copper-plated graphite powder was 89:11. The graphite composite powder coated with copper oxide was proved to be formed of graphite and copper (II) oxide wide angle X-ray diffraction measurement. The copper oxide coated graphite composite powder with addition of a nonionic dispersing agent and a polytetrafluoroethylene-dispersed solution was formed into paste. (The weight ratio of the graphite composite powder and polytetrafluoroethylene was 77:23 after dried.) The paste was applied on both sides of a copper foil current collector, dried at 60° C., heat-treated at 240° C., then pressed and dried at 200° C. under reduced pressure for removal of water, in order to form a negative electrode. The resulting negative electrode had a surface area of 8 cm$^2$ and a thickness of 83 μm. (The thickness of the current collector 50 μm.)

The negative electrode of Embodiment 30 was evaluated similarly to the case of Embodiment 24, and it was found that discharge capacity at the second cycle was 387 mAh per unit volume of the electrode, and discharge capacity at the 10th cycle was 359 mAh.

COMPARISON EXAMPLE 16

Graphite composite powder coated with copper oxide was fabricated similarly to the case of Embodiment 30. Then, a negative electrode was fabricated according to a method substantial identical to Embodiment 30 with an essential difference being that the weight ratio of the graphite composite powder and polytetrafluoroethylene was 63:37. The resulting negative electrode had a surface area of 8 cm$^2$ and a thickness of 88 μm. (The thickness of the current collector was 50 μm.)

The negative electrode of Comparison Example 16 was evaluated in the same manner as Embodiment 30, and it was found that discharge capacity at the second cycle was 362 mAh for unit volume of the electrode, and discharge capacity at the 10th cycle was 344 mAh.

EMBODIMENT 31

Graphite composite powder coated with copper oxide was fabricated in the same manner as Embodiment 30. A negative electrode was fabricated according to a method substantially identical to Embodiment 24 with an essential difference being that the weight ratio of the resulting graphite composite powder and polytetrafluoroethylene was 97:3. The resulting negative electrode had a surface area of 8 cm$^2$ and a thickness of 76 μm. (The thickness of the current collector was 50 μm.)

The negative electrode of Embodiment 31 was evaluated similarly to the case of Embodiment 24 and it was found that discharge capacity at the second cycle was 415 mAh per unit volume of the electrode, and discharge capacity at 10th cycle was 351 mAh.

COMPARISON EXAMPLE 17

Graphite composite powder coated with copper oxide was fabricated in the same manner as Embodiment 30.

A negative electrode was fabricated according to a method substantially identical to Embodiment 24 with an essential difference being that the weight ratio of the resulting graphite composite powder and polytetrafluoroethylene was 99.5:0.5. In the resulting negative electrode, however, the graphite composite powder fell off from the current collector.

Results in Embodiments 30 and 31 and Comparison Examples 16 and 17 were set forth in Table 6. As can be seen from the results of Embodiment 24 to 29 set forth in Table 5 and Table 6, the weight ratio of graphite composite powder coated with copper oxide and a binder is preferably in the range of 99:1 to 70:30.

TABLE 6

| | Weight Ratio of Graphite to Copper | Weight Ratio of Graphite + Sticking Copper Oxide to PTFE | Discharge Capacitance (mAh/g) 2nd Cycle | Discharge Capacitance (mAh/g) 10th Cycle | Remarks |
|---|---|---|---|---|---|
| Embodiment 30 | 89:11 | 77:23 | 387 | 359 | |
| Comparison Example 16 | 89:11 | 62:37 | 362 | 344 | |
| Embodiment 31 | 89:11 | 97:3 | 415 | 351 | |
| Comparison Example 17 | 89:11 | 99.5:0.5 | — | — | fall off |

*PTFE: polytetrafluoroethylene

EMBODIMENT 32

Graphite composite powder coated with copper oxide was fabricated according to a method substantially identical to Embodiment 29 except that artificial graphite (flaky, particle size=7 μm, d$_{002}$=0.336 nm, Lc=22 nm, La=13 nm, R=0.1, specific surface area=10 m$^2$/g) was used. The weight ratio of the graphite and copper in the copper-plated graphite powder was 89:11. The graphite composite powder coated with copper oxide was proved to be formed of graphite and copper (II) oxide by wide angle X-ray diffraction measurement.

The graphite composite powder coated with copper (II) oxide with addition of a solution containing N, N-dimethylformamide and polyvinylidene fluoride in the weight ratio of 1.5:0.05 was formed into paste. The weight ratio of the graphite composite and polyvinylidene fluoride was 91:9 after dried. The paste was applied onto both sides of a stainless steel foil current collector, dried at 65° C., heat-treated at 155° C., then pressed and dried at 16° C. under reduced pressure for removal of water, in order to form a negative electrode. The resulting negative electrode had a surface area of 8 cm$^2$ and a thickness of 72 μm. (The thickness of the current collector was 50 μm.)

The negative electrode of Embodiment 32 was evaluated similarly to the case of Embodiment 24, and it was found that discharge capacity at the second cycle was 441 mAh per unit volume of the electrode and discharge capacity at the 10th cycle was 416 mAh.

EMBODIMENT 33

The graphite composite powder coated with copper oxide was fabricated according to a method substantial identical to Embodiment 29 except that denatured graphite (flaky, particle size=7 μm, d$_{002}$=0.336 nm, Lc=22 nm, La=13 nm, R=0.1, specific surface area=10 m$^2$/g) was used as graphite particles. The weight ratio of graphite and copper in the copper-plated graphite powder was 98.1:1.9. The graphite composite powder coated with copper oxide was proved to be formed of graphite and copper (II) oxide by wide angle X-ray diffraction measurement. With the graphite composite powder, a negative electrode was fabricated in the same manner as Embodiment 24. The resulting negative electrode had a surface area of 8 cm$^2$ and a thickness of 70 μm. (The thickness of the current collector was 50 μm.)

The negative electrode of Embodiment 33 was evaluated similarly to the case of Embodiment 24, and it was found that discharge capacity at the second cycle was 397 mAh per unit volume of the electrode, and discharge capacity for the 10th cycle was 374 mAh.

EMBODIMENT 34

Graphite composite powder coated with copper oxide was fabricated according to a method substantially identical to Embodiment 33 with an essential difference being that the weight ratio of graphite and copper in the copper-plated graphite powder was 95:5. With the graphite composite powder, a negative electrode was fabricated in the same manner as the case of Embodiment 24. The resulting negative electrode had a surface area of 8 cm$^2$ and a thickness of 78 nm. (The thickness of the current collector was 50 μm.)

The negative electrode of Embodiment 34 was evaluated similarly to the case of Embodiment 24, and it was found that discharge capacity at the second cycle was 536 mAh per unit volume of the electrode, and discharge capacity at the 10th cycle was 501 mAh.

EMBODIMENT 35

Graphite composite powder coated with copper oxide was fabricated according to a method substantially identical to Embodiment 33 except that the weight ratio of graphite and copper in the copper-plated graphite powder was 91:9. With the graphite composite powder, a negative electrode was fabricated in the same manner as Embodiment 24. The resulting negative electrode had a surface area of 8 cm$^2$ and a thickness of 76 μm. (The thickness of the current collector was 50 μm.)

The negative electrode of Embodiment 35 was evaluated similarly to the case of Embodiment 24, and it was found that discharge capacity at the second cycle was 425 mAh per unit volume of the electrode, and discharge capacity at the 10th cycle was 412 mAh.

EMBODIMENT 36

Graphite composite powder coated with copper oxide was fabricated according to a method substantially identical to Embodiment 33 with an essential difference being that the weight ratio of graphite and copper in the copper-plated graphite powder was 83:17. With the graphite composite powder, a negative electrode was fabricated in the same manner as Embodiment 24. The resulting negative electrode had a surface area of 8 cm$^2$ and a thickness of 80 μm. (The thickness of the current collector was 50 μm.)

The negative electrode of Embodiment 36 was evaluated similarly to the case of Embodiment 24, and it was found that discharge capacity at the second cycle was 420 mAh per unit volume of the electrode, and discharge capacity at the 10th cycle was 405 mAh.

EMBODIMENT 37

Graphite composite powder coated with copper oxide was fabricated according to a method substantially identical to Embodiment 33 with an essential difference being that the weight ratio of graphite and copper in the copper-plated graphite powder was 77:23. With the graphite composite powder, a negative electrode was fabricated in the same manner as Embodiment 24. The resulting negative electrode had a surface area of 8 cm$^2$ and a thickness of 79 μm. (The thickness of the current collector was 50 μm.) The negative electrode of Embodiment 37 was evaluated similarly to the case of Embodiment 24, and it was found that discharge capacity at the second cycle was 381 mAh per unit volume of the electrode, and discharge capacity at the 10th cycle was 368 mAh.

EMBODIMENT 38

Graphite composite powder coated with copper oxide was fabricated according to a method substantially identical to Embodiment 33 except that the weight ratio of graphite and copper in the copper-plated graphite powder was 71:29. With the graphite composite powder, a negative electrode was fabricated similarly to the case of Embodiment 24. The resulting negative electrode had a surface area of 8 cm$^2$ and a thickness of 83 μm. (The thickness of the current collector was 50 μm.)

The negative electrode of Embodiment 38 was evaluated similarly to the case of Embodiment 24, and it was found that discharge capacity at the second cycle was 373 mAh per unit volume of the electrode, and discharge capacity at the 10th cycle was 358 mAh.

EMBODIMENT 39

Graphite composite powder coated with copper oxide was fabricated according to a method substantially identical to Embodiment 33 except that the weight ratio of graphite and copper in the copper-plated graphite powder was 67:33. With the graphite composite powder, a negative electrode was fabricated similarly to the case of Embodiment 24. The resulting negative electrode had a surface area of 8 cm$^2$ and a thickness of 81 μm. (The thickness of the current collector was 50 μm.)

The negative electrode of Embodiment 39 was evaluated similarly to the case of Embodiment 24, and it was found that discharge capacity at the second cycle was 375 mAh per unit volume of the electrode, and discharge capacity at the 10th cycle was 349 mAh.

EMBODIMENT 40

Graphite composite powder coated with copper oxide was fabricated according to a method substantially identical to Embodiment 33 with an essential difference being that the weight ratio of graphite and copper in the copper-plated graphite powder was 62.5:37.5. With the graphite composite powder, a negative electrode was fabricated in the same manner as Embodiment 24. The resulting negative electrode had a surface area of 8 cm$^2$ and a thickness of 85 μm. (The thickness of the current collector was 50 μm.)

The negative electrode of Embodiment 40 was evaluated similarly to the case of Embodiment 24, and it was found that discharge capacity at the second cycle was 371 mAh per unit volume of the electrode, and discharge capacity at the 10th cycle was 346 mAh.

COMPARISON EXAMPLE 18

A negative electrode was fabricated according to a method substantially identical to Embodiment 33 except that denatured graphite (flaky, particle size=7 μm, $d_{002}$=0.336 nm, Lc=22 nm, La=13 nm, R=0.1, specific surface area=10 m$^2$/g) was used and a copper oxide coating was not formed.

The resulting negative electrode had a surface area of 8 cm$^2$ and a thickness of 77 μm. (The thickness of the current collector was 50 μm.)

The negative electrode of Comparison Example 18 was evaluated similarly to the case of Embodiment 24, discharge capacity at the second cycle was 361 mAh per unit volume of the electrode, and discharge capacity at the 10th cycle was 340 mAh.

COMPARISON EXAMPLE 19

Graphite composite powder coated with copper oxide was fabricated according to a method substantially identical to Embodiment 33 except that the weight ratio of graphite and copper in the copper-plated graphite powder was 99:1. With the graphite composite powder, a negative electrode was fabricated similarly to the case of Embodiment 24. The resulting negative electrode had a surface area of 8 cm$^2$ and a thickness of 72 μm. (The thickness of the current collector was 50 μm.)

The negative electrode of Comparison Example 19 was evaluated similarly to the case of Embodiment 24, and it was found that discharge capacity at the second cycle was 364 mAh per unit volume of the electrode, and discharge capacity at the 10th cycle was 332 mAh.

COMPARISON EXAMPLE 20

Graphite composite powder coated with copper oxide was fabricated according to a method substantially identical to Embodiment 33 except that the weight ratio of graphite and copper in the copper-plated graphite powder was 59:41. With the graphite composite powder, a negative electrode was fabricated in the same manner as Embodiment 24. The resulting negative electrode had a surface area of 8 cm$^2$ and a thickness of 87 μm. (The thickness of the current collector was 50 μm.)

The negative electrode of Comparison Example 20 was evaluated similarly to the case of Embodiment 24, and it was found that discharge capacity at the second cycle was 352 mAh per unit volume of the electrode, and discharge capacity at the 10th cycle was 316 mAh.

COMPARISON EXAMPLE 21

Graphite composite powder coated with copper oxide was fabricated according to a method substantially identical to Embodiment 33 except that the weight ratio of graphite and copper in the copper-plated graphite powder was 53:47. With the graphite composite powder, a negative electrode was fabricated similarly to the case of Embodiment 24. The resulting negative electrode had a surface area of 8 cm$^2$ and a thickness of 86 μm. (The thickness of the current collector was 50 μm.)

The negative electrode of Comparison Example 21 was evaluated similarly to the case of Embodiment 24, and it was found that discharge capacity at the second cycle was 320 mAh per unit volume of the electrode, and discharge capacity at the 10th cycle was 304 mAh.

Figure 4:
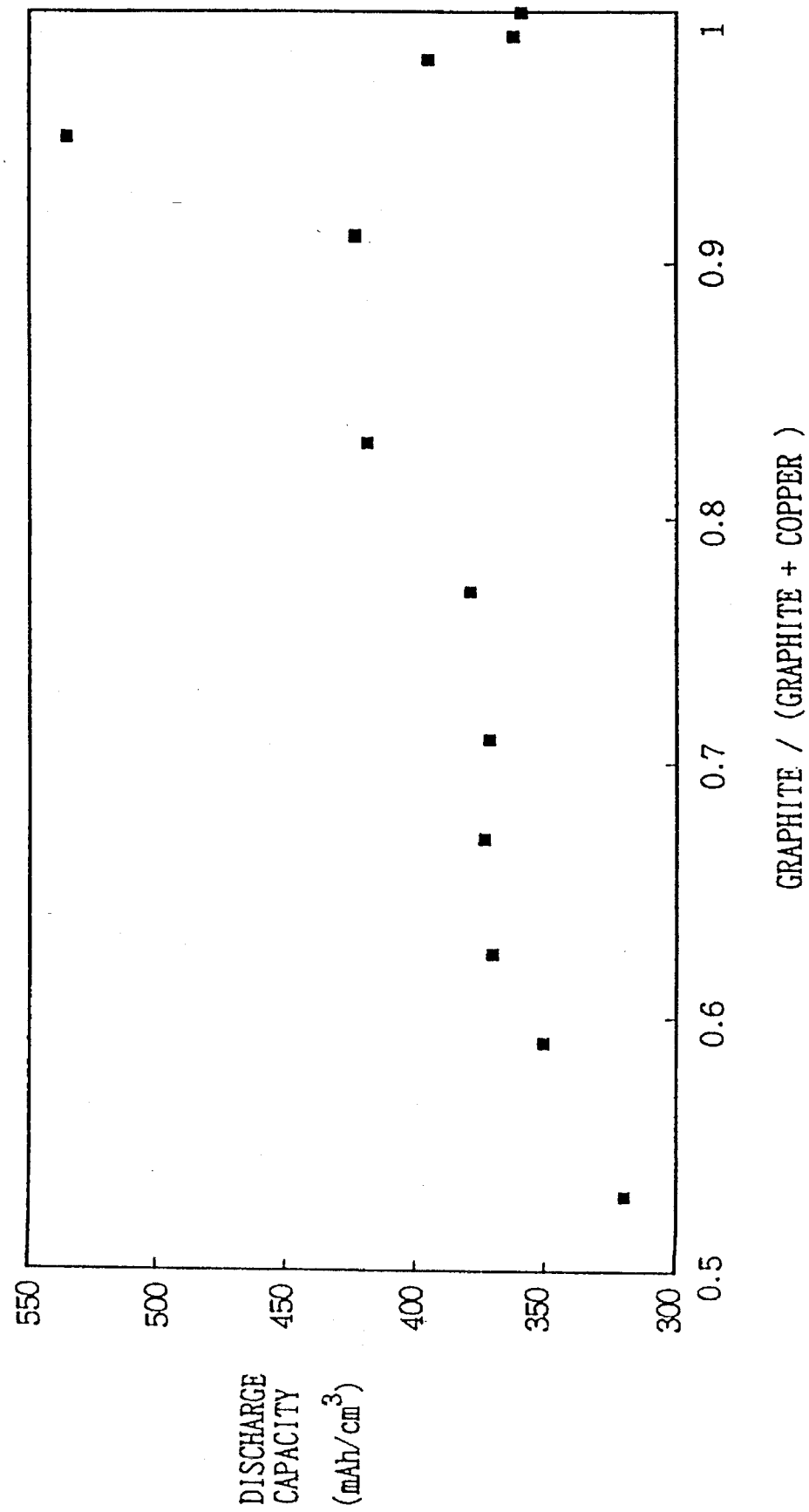
FIG. 4 is a graph showing discharge capacities depending upon ratios of graphite and copper in a negative electrode including composite graphite particles with an oxidized copper layer covering the surface of the graphite particles.

Results in Embodiments 33 to 40 and Comparison Examples 18 to 21 are set forth in Table 7 and FIG. 4. In FIG. 4, the abscissa represents weight ratios of graphite in copper-plated graphite powder and the ordinate represents discharge capacities per unit volume of negative electrode at the time of discharge in the second cycle. As can be seen from Table 7 and FIG. 4, the weight ratio of graphite and copper in the copper-plated graphite powder is preferably in the range from 98.5:1.5 to 62:38, more preferably in the range from 98.5:1.5 to 75:25.

TABLE 7

| | Weight Ratio | Discharge Capacitance (mAh/g) | |
|---|---|---|---|
| | Graphite / (Graphite + Copper Oxide) | 2nd Cycle | 10th Cycle |
| Embodiment 33 | 0.981 | 397 | 374 |
| Embodiment 34 | 0.95 | 536 | 501 |
| Embodiment 35 | 0.91 | 425 | 412 |
| Embodiment 36 | 0.83 | 420 | 405 |
| Embodiment 37 | 0.77 | 381 | 368 |
| Embodiment 38 | 0.71 | 373 | 358 |
| Embodiment 39 | 0.67 | 375 | 349 |
| Embodiment 40 | 0.625 | 371 | 346 |
| Comparison Example 18 | 1 | 361 | 340 |
| Comparison Example 19 | 0.99 | 364 | 332 |
| Comparison Example 20 | 0.59 | 352 | 316 |
| Comparison Example 21 | 0.53 | 320 | 304 |

EMBODIMENT 41

Manufacture of Negative Electrode

Graphite composite powder coated with copper oxide was produced similarly to the case of Embodiment 30. Thus produced graphite composite powder, with addition of a nonionic dispersing agent and a polytetrafluoroethylene-dispersed solution, was formed into paste. (the weight ratio of graphite composite powder and polytetrafluoroethylene was 91:9 after dried.)

The paste was filled within pores of a nickel porous current collector, dried at 60° C., heat-treated at 240° C., then pressed, and dried at 200° C. under reduced pressure for removal of water, in order to form a negative electrode. The resulting negative electrode had a circular shape, a diameter of 14.5 mm and a thickness of 0.41 mm.

Manufacture of Positive Electrode

A positive electrode was manufactured similarly to the case of Embodiment 22, and the resulting positive electrode had a circular plate shape, a diameter of 14.5 mm, and a thickness of 0.93 mm.

Assembling of Battery

With thus manufactured negative electrode and positive electrode, a coin type battery was fabricated according to the same method as Embodiment 22.

Evaluation of Battery

The battery of Embodiment 41 was evaluated similarly to the case of Embodiment 22. As a result, mean voltage at the time of discharge of the battery was 3.7 V, discharge capacity at the second cycle was 19 mAh, and discharge capacity at the 10th cycle was 17 mAh.

COMPARISON EXAMPLE 22

A negative electrode was fabricated according to the same method as Embodiment 41 except that natural graphite powder produced in Madagascar was not coated with copper oxide. Manufacturing of a positive electrode and assembling of the battery were conducted similarly to the case of Embodiment 41.

The resulting battery of Comparison Example 22 was evaluated similarly to the case of Embodiment 41, and mean voltage at the time of discharge was 3.7 V, discharge capacity at the second cycle was 14 mAh, and discharge capacity at the 10th cycle was 13 mAh.

EMBODIMENT 42

Manufacture of Negative Electrode

Graphite composite powder coated with copper oxide was produced similarly to the case of Embodiment 34. The graphite composite powder with addition of a nonionic dispersing agent and a polytetrafluoroethylene-dispersed solution, was formed into paste. (the weight ratio of the graphite composite powder and polytetrafluoroethylene was 91:9 after dried.) The paste was filled within pores of a nickel porous current collector in order to form a negative electrode. The paste applied onto the current collector was dried at 60° C., heat-treated at 240° C., then pressed, and dried at 200° C. under reduced pressure for removal of water, in order to form a negative electrode. Thus obtained negative electrode had a shape of circular plate, a diameter of 14.3 mm, and a thickness of 0.37 mm.

Manufacture of Positive Electrode

The positive electrode fabricated similarly to the case of Embodiment 23 had a circular plate shape, a diameter of 14.5 mm and a thickness of 1.0 mm.

Assembling of Battery

With thus fabricated positive electrode and negative electrode, a coin type battery was manufactured in the same manner as Embodiment 23.

Evaluation of Battery

The coin type battery of Embodiment 42 was evaluated similarly to the case of Embodiment 23. As a result, in the battery of Embodiment 42, mean voltage at the time of discharge was 3.7 V, discharge capacity at the second cycle was 20 mAh and discharge capacity at the 10th cycle was 15 mAh.

COMPARISON EXAMPLE 23

A negative electrode was fabricated according to a method substantially identical to Embodiment 42 except that denatured graphite (flaky, particle size=7 μm, $d_{002}$=0.336 nm, Lc=22 nm, La=13 nm, R=0.1, specific surface area=10 $m^2/g$) was used and a copper oxide coating was not formed. The resulting negative electrode had the same thickness as that of Embodiment 42. Manufacturing of a positive electrode and assembling of the battery were conducted similarly to the case of Embodiment 42.

The battery of Comparison Example 23 was evaluated similarly to the case of Embodiment 42, mean voltage at the time of discharge was 3.7 V, discharge capacity at the second cycle was 13 mAh, and discharge capacity at the 10th cycle was 12 mAh.

Results in Embodiments 41 and 42, and Comparison Examples 22 and 23 were set forth in Table 8. As can be seen from Table 8, use of negative electrodes containing graphite composite powder coated with copper oxide can produce lithium secondary batteries with high capacities.

TABLE 8

| | Negative Electrode | | | Discharge Capacitance (mAh/g) | |
|---|---|---|---|---|---|
| | Kind of Graphite | Weight Ratio of Graphite to Copper | Positive Electrode Active Material | 2nd Cycle | 10th Cycle |
| Embodiment 41 | Natural Graphite | 9.5:0.5 | $Li_{0.98}Co_{0.95}Sb_{0.05}O_2$ | 19 | 17 |
| Comparison Example 22 | Natural Graphite | 10:0 | $Li_{0.98}Co_{0.95}Sb_{0.05}O_2$ | 14 | 13 |
| Embodiment 42 | Denatured Graphite | 9:1 | $LiMn_2O_4$ | 20 | 15 |
| Comparison Example 23 | Denatured Graphite | 10:0 | $LiMn_2O_4$ | 13 | 12 |

FIG. 5 shows an example of unexpected effects brought about by the present invention. In the graph in FIG. 5, the abscissa represents the weight ratio of graphite in graphite composite powder coated with copper oxide, and the ordinate represents discharge capacity for the second cycle per unit volume of a negative electrode at the time of discharge. In the graph, curve 5A in broken line corresponds to the curve shown in FIG. 4. Curve 5B in solid line indicates the discharge capacity produced by a calculation based on the respective discharge capacities of a negative electrode having graphite as a main constituent and a negative electrode having copper (II) oxide as a main constituent. More specifically, discharge capacities were measured in the negative electrode having copper (II) oxide as a main constituent and the negative electrode having graphite as a main constituent.

In order to measure the discharge capacity of the negative electrode having copper (II) oxide as a main constituent, copper (II) oxide powder and 5 wt % acetylene black (conductive material) were mixed to form a negative electrode similarly to the case of Embodiment 24. (The weight ratio of copper (II) oxide and polytetrafluoroethylene was 87:13 after dried). The negative electrode having copper (II) oxide as a main constituent was evaluated similarly to the case of Embodiment 24, and it was found that discharge capacity for the second cycle was 75 mAh per 1 g of copper (II) oxide.

Now, in order to measure the discharge capacity of the negative electrode having graphite as a main constituent, a negative electrode was fabricated according to a method similar to Comparison Example 18. As a result, in the negative electrode having graphite as a main constituent, discharge capacity for the second cycle was 349 mAh per 1 g of graphite.

Curve 5B represents a result of calculation with the following expression (1) based on the negative electrode having copper (II) oxide as main constituent and the negative electrode having graphite as main constituent.

$$\text{Calculated capacity (mAh/cm}^3\text{)} = \{W \times Q_c + (1-W) \times Q_{CuO}\} \times D \quad (1)$$

where W is the weight ratio of graphite relative to the sum of the weights of graphite and copper (II) oxide, $Q_c$ represents discharge capacity (mAh/g) per 1 g of graphite, $Q_{CuO}$ represents discharge capacity (mAh/g) per 1 g of copper (II) oxide, and D represents the density (g/cm$^3$) of the negative electrode material.

More specifically, as can be understood from a comparison between curve 5A and curve 5B in FIG. 5, the negative electrode according to the invention has discharge capacity far larger than a simple summation of discharge capacities based on graphite and copper (II) oxide contained in the negative electrode. Accordingly, it is considered that in addition to increase of capacity by a reversible formation and decomposition of a composite oxide of lithium and copper, a reaction of lithium and graphite is promoted by the influence of the composite oxide, and therefore even higher discharge capacity may result.

Table 9 shows the densities of graphite in the negative electrodes according to various embodiments and comparison examples described above. Graphite density in Table 9 corresponds to graphite weight (g) included in a negative electrode material per unit volume (1 cm$^3$). With Table 9, discharge capacity per unit volume (1 cm$^3$) of a negative electrode can be converted to discharge capacity for unit weight (g) of graphite and vice versa.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a lithium secondary battery including a positive electrode, a nonaqueous ion conductive medium, and a negative electrode, said negative electrode including as a main constituent graphite particles which permit intercalation and deintercalation of lithium ions, together with copper oxide covering the surface of at least part of said graphite particles and a binder, said manufacturing method comprising the steps of:

coating the surface of at least part of said graphite particles with a copper layer; and oxidizing the copper layer coating the surface of said graphite particles.

2. A method of manufacturing a lithium secondary battery as recited in claim 1, wherein said copper layer is formed by an electroless plating method.

* * * * *

TABLE 9

| Embodiment | Density (g/cm$^3$) | Comparison Example | Density (g/cm$^3$) | Embodiment | Density (g/cm$^3$) | Comparison Example | Density (g/cm$^3$) |
|---|---|---|---|---|---|---|---|
| 1 | 1.03 | 1 | 1.08 | 24 | 1.03 | 12 | 1.03 |
| 2 | 1.05 | 2 | 1.02 | 25 | 1.05 | 13 | 1.04 |
| 3 | 1.02 | 3 | 1.01 | 26 | 1.02 | 14 | 1.03 |
| 4 | 1.04 | 4 | 1.02 | 27 | 1.01 | 15 | 1.03 |
| 5 | 1.05 | 5 | 1.02 | 28 | 1.03 | 16 | 1 |
| 6 | 1.07 | 6 | — | 29 | 1.01 | 17 | — |
| 7 | 1.07 | 7 | 1.01 | 30 | 1.01 | 18 | 1.04 |
| 8 | 1.01 | 8 | 0.53 | 31 | 1.04 | 19 | 1.03 |
| 9 | 1.05 | 9 | 0.37 | 32 | 1.02 | 20 | 1.01 |
| 10 | 1.07 | | | 33 | 1.02 | 21 | 0.93 |
| 11 | 1.03 | | | 34 | 1.07 | | |
| 12 | 1.04 | | | 35 | 1.02 | | |
| 13 | 1.01 | | | 36 | 1.03 | | |
| 14 | 1.03 | | | 37 | 1.02 | | |
| 15 | 1.03 | | | 38 | 1.01 | | |
| 16 | 1.04 | | | 39 | 1.02 | | |
| 17 | 1.05 | | | 40 | 1.01 | | |
| 18 | 1.01 | | | | | | |
| 19 | 10.2 | | | | | | |
| 20 | 1.03 | | | | | | |
| 21 | 0.97 | | | | | | |